US011509458B2

(12) United States Patent
Shemer et al.

(10) Patent No.: US 11,509,458 B2
(45) Date of Patent: *Nov. 22, 2022

(54) METHOD AND SYSTEM FOR SECURELY REPLICATING ENCRYPTED DEDUPLICATED STORAGES

(71) Applicant: EMC IP Holding Company LLC, Hopkinton, MA (US)

(72) Inventors: Jehuda Shemer, Kfar Saba (IL); Assaf Natanzon, Tel Aviv (IL)

(73) Assignee: EMC IP HOLDING COMPANY LLC, Hopkinton, MA (US)

(\*) Notice: Subject to any disclaimer, the term of this patent is extended or adjusted under 35 U.S.C. 154(b) by 129 days.

This patent is subject to a terminal disclaimer.

(21) Appl. No.: 16/931,582

(22) Filed: Jul. 17, 2020

(65) Prior Publication Data

US 2020/0351084 A1 Nov. 5, 2020

Related U.S. Application Data

(63) Continuation of application No. 16/158,689, filed on Oct. 12, 2018, now Pat. No. 10,756,887.

(51) Int. Cl.
*H04L 29/00* (2006.01)
*H04L 9/08* (2006.01)
*H04L 9/14* (2006.01)
*H04L 9/30* (2006.01)
*G06F 16/27* (2019.01)

(52) U.S. Cl.
CPC .......... *H04L 9/0825* (2013.01); *G06F 16/27* (2019.01); *H04L 9/083* (2013.01); *H04L 9/14* (2013.01); *H04L 9/30* (2013.01)

(58) Field of Classification Search
CPC ......... H04L 9/0825; H04L 9/083; H04L 9/14; H04L 9/30; G06F 16/27
See application file for complete search history.

(56) References Cited

U.S. PATENT DOCUMENTS 5,838,792 A \* 11/1998 Ganesan ............. H04L 63/0823
380/282
8,954,756 B2 \* 2/2015 Koifman ............. G06F 21/6209
380/42
10,326,803 B1 \* 6/2019 Haney .................... H04L 63/30
(Continued)

*Primary Examiner* — Don G Zhao
(74) *Attorney, Agent, or Firm* — Chamberlain, Hrdlicka, White, Williams & Aughtry

(57) ABSTRACT

A method and system for securely replicating encrypted deduplicated storages. Specifically, the method and system disclosed herein entail the replication and migration of encrypted data between storage systems that support deduplication. More specifically, a first encrypted data, which may have been encrypted using a first public cryptographic key and consolidated on a source storage system, may be translated into an interim (yet still encrypted) state using a first split private cryptographic key. Thereafter, using a compound conversion key, the interim state data may be further translated into a second encrypted data, which may be characterized as being encrypted by a second public cryptographic key. Therefore, substantively, the method and system disclosed herein may be directed to the translation of encrypted data from one encryption scheme to another while in-flight from a source storage system to a target storage system.

20 Claims, 18 Drawing Sheets

(56) References Cited

U.S. PATENT DOCUMENTS

| | | | |
|---|---|---|---|
| 2003/0147536 A1* | 8/2003 | Andivahis | H04L 63/0823 380/277 |
| 2005/0050343 A1* | 3/2005 | Selinfreund | G11B 19/04 |
| 2006/0085354 A1* | 4/2006 | Hirai | G06F 21/606 705/59 |
| 2007/0258595 A1* | 11/2007 | Choy | H04L 9/0827 380/278 |
| 2010/0083003 A1* | 4/2010 | Spackman | H04L 9/0643 713/193 |
| 2012/0173881 A1* | 7/2012 | Trotter | H04L 9/0894 713/189 |
| 2012/0204032 A1* | 8/2012 | Wilkins | H04L 63/0428 713/170 |
| 2012/0331088 A1* | 12/2012 | O'Hare | H04L 67/1097 709/214 |
| 2015/0121063 A1* | 4/2015 | Maller | H04L 63/0435 713/153 |
| 2016/0357980 A1* | 12/2016 | Balasubramanian | G06F 21/6218 |
| 2017/0070487 A1* | 3/2017 | Greenberg | H04W 12/02 |
| 2019/0007382 A1* | 1/2019 | Nirwal | G06F 9/54 |
| 2019/0052468 A1* | 2/2019 | Ngoc-Ai Lu | H04L 9/3247 |
| 2019/0171829 A1* | 6/2019 | Tackabury | G06F 21/6209 |

* cited by examiner

METHOD AND SYSTEM FOR SECURELY REPLICATING ENCRYPTED DEDUPLICATED STORAGES

CROSS-REFERENCE TO RELATED APPLICATIONS

This application is a continuation application of U.S. patent application Ser. No. 16/158,689, filed on Oct. 12, 2018, and entitled: "METHOD AND SYSTEM FOR SECURELY REPLICATING ENCRYPTED DEDUPLICATED STORAGES." Accordingly, this application claims benefit of U.S. patent application Ser. No. 16/158,689 under 35 U.S.C. § 120. U.S. patent application Ser. No. 16/158,689 is hereby incorporated by reference in its entirety.

BACKGROUND

Existing solutions directed to the replication of encrypted storages often follow a naïve approach, which entails retaining the same encryption scheme across the different storage systems. For data security experts, this sharing of the same encryption scheme is a risky and ill-recommended approach.

DETAILED DESCRIPTION

Figure 1:
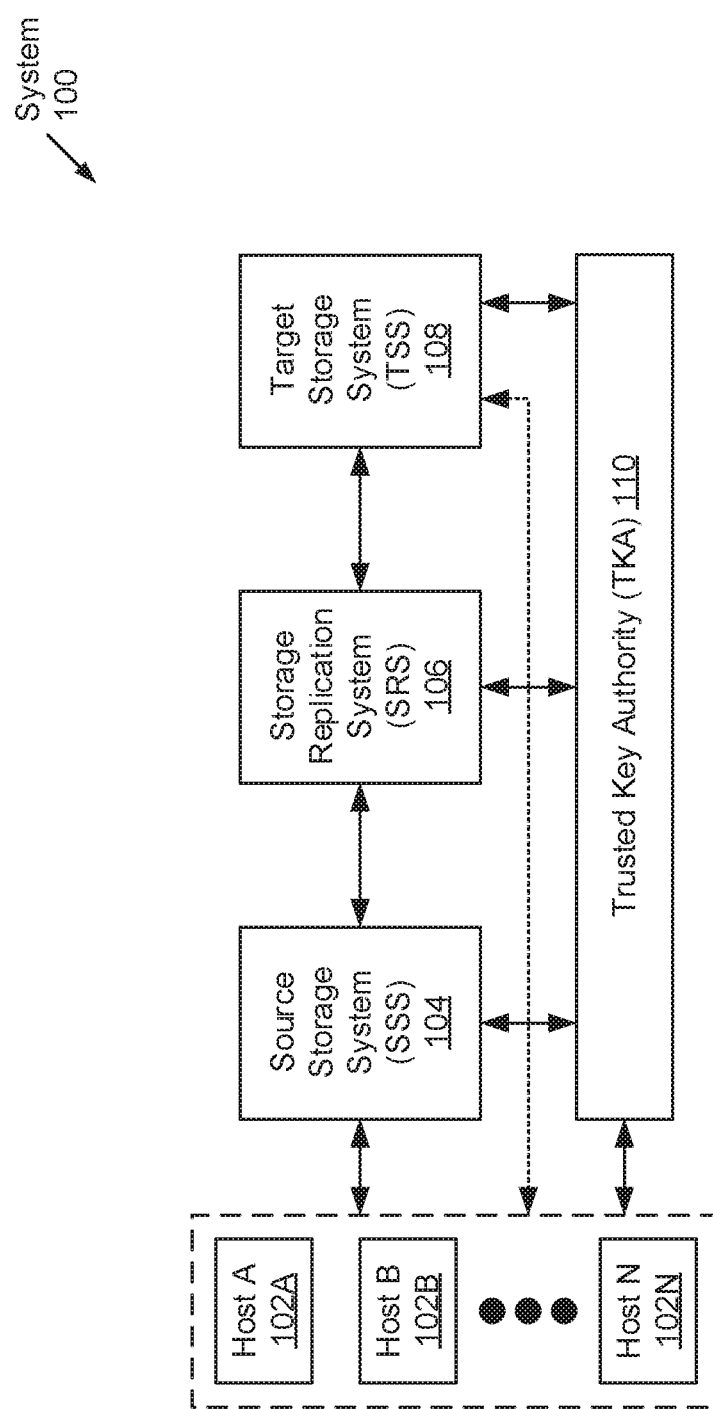
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-13, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for securely replicating encrypted deduplicated storages. Specifically, one or more embodiments of the invention entails the replication and migration of encrypted data between storage systems that support deduplication. More specifically, a first encrypted data, which may have been encrypted using a first public cryptographic key and consolidated on a source storage system, may be translated into an interim (yet still encrypted) state using a first split private cryptographic key. Thereafter, using a compound conversion key, the interim state data may be further translated into a second encrypted data, which may be characterized as being encrypted by a second public cryptographic key. Therefore, substantively, embodiments of the invention may be directed to the translation of encrypted data from one encryption scheme to another while in-flight from a source storage system to a target storage system.

Existing solutions directed to the replication of encrypted storages often follow a naïve approach, which entails retaining the same encryption scheme across the different storage systems. That is, a same or common public cryptographic key is used in the encryption of data consolidated in a source storage system, as well as in the encryption of data consolidated in a target storage system. For data security experts, this sharing of the same encryption scheme, which utilizes the same public cryptographic key to encrypt stored data, is a risky and ill-recommended approach. One reason data security experts may ill-advise existing solutions as they stand is the threat to data, stored not just on the source storage system but also the target storage system, should the private cryptographic key (matching the aforementioned common public cryptographic key) be ascertained by unauthorized entities (e.g., hackers, scammers, etc.). Subsequently, all data across the different storage systems are susceptible to corruption, deletion, or ransom.

Embodiments of the invention, however, address these security vulnerabilities by ensuring that data, retained at different storage systems, is encrypted using different public cryptographic keys and, thus, different encryption schemes. Further, through embodiments of the invention, at no time during the encrypted data replication and migration process between storage systems is the encrypted data decrypted. Instead, the encrypted data may be translated from one encryption scheme (used at a source storage system) to another, different encryption scheme (used at a target source system). Accordingly, through this translation, rather than the performance of decryption and re-encryption operations, the data is at no time compromised or exposed.

FIG. 1 shows a system in accordance with one or more embodiments of the invention. The system (100) may include one or more hosts (102A-102N), a source storage system (SSS) (104), a storage replication system (SRS) (106), a target storage system (TSS) (108), and a trusted key authority (TKA) (110). Each of these components is described below.

In one embodiment of the invention, the above-mentioned components may be directly or indirectly connected to one another through a network (not shown) (e.g., a local area network (LAN), a wide area network (WAN) such as the Internet, a mobile network, or any other network). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing. Further, the above-mentioned components may communicate with one another using any combination of wired and/or wireless communication protocols.

In one embodiment of the invention, each host (102A-102N) may be any physical computing system that may be used for various applications. These applications may, for example, require large-scale and complex data processing. In one embodiment of the invention, each host (102A-102N) may be any physical computing system that may serve multiple users concurrently. Further, each host (102A-102N) may be programmed to provide and manage the allocation of computing resources (e.g., computer processors, memory, storage, network bandwidth, etc.) towards the execution of various processes (or tasks) that may be instantiated by one or more users and/or operating systems (OSs). Each host (102A-102N) may include further functionality to encrypt and decrypt host data in accordance with one or more embodiments of the invention (see e.g., FIG. 9). Moreover, each host (102A-102N) may be operatively connected to the SSS (104), the TSS (108), and the TKA (110). Examples of each host (102A-102N) may include, but are not limited to, a desktop computer, a laptop computer, a smartphone, a tablet computer, a server, a mainframe, or any computing system similar to the exemplary computing system shown in FIG. 13. Hosts are described in further detail below with respect to FIG. 2.

In one embodiment of the invention, the SSS (104) may be a primary data backup, archiving, and/or disaster recovery storage system used by the one or more hosts (102A-102N). The SSS (104) may be implemented using one or more servers (not shown). Each server may be a physical server (i.e., residing in a datacenter) or a virtual server (i.e., residing in a cloud computing environment). In one embodiment of the invention, the SSS (104) may be implemented using one or more computing systems similar to the exemplary computing system shown in FIG. 13. Further, the SSS (104) may be a storage system capable of supporting data deduplication. Data deduplication may refer to a data compression technique directed to eliminating duplicate (or redundant) blocks of data, thereby reducing storage overhead. The SSS (104) may include functionality to: store primary backup copies of various forms of information pertinent to one or more hosts (102A-102N) (see also e.g., FIG. 10A); and fulfill data retrieval requests (described below) in accordance with one or more embodiments of the invention (see e.g., FIG. 10B). Moreover, the SSS (104) may be operatively connected to one or more hosts (102A-102N), the SRS (106), and the TKA (110). The SSS (104) is described in further detail below with respect to FIG. 3.

In one embodiment of the invention, the SRS (106) may be an encrypted data replication and migration service. The SRS (106) may be implemented using one or more servers (not shown). Each server may be a physical server (i.e., residing in a datacenter) or a virtual server (i.e., residing in a cloud computing environment). In one embodiment of the invention, the SRS (106) may be implemented using one or more computing systems similar to the exemplary computing system shown in FIG. 13. Further, the SRS (106) may include functionality to fulfill storage replication requests (described below) in accordance with one or more embodiments of the invention (see e.g., FIGS. 11A and 11B). Moreover, the SRS (106) may be operatively connected to the SSS (104), the TSS (108), and the TKA (110). The SRS (106) is described in further detail below with respect to FIG. 4.

In one embodiment of the invention, the TSS (108) may be a secondary data backup, archiving, and/or disaster recovery storage system used by the one or more hosts (102A-102N). The TSS (108) may be implemented using one or more servers (not shown). Each server may be a physical server (i.e., residing in a datacenter) or a virtual server (i.e., residing in a cloud computing environment). In one embodiment of the invention, the TSS (108) may be implemented using one or more computing systems similar to the exemplary computing system shown in FIG. 13. Further, the TSS (108) may be a storage system capable of supporting data deduplication (described above). The TSS (108) may include functionality to store secondary backup copies of various forms of information pertinent to one or more hosts (102A-102N) (see also e.g., FIG. 12). Moreover, the TSS (108) may be operatively connected to one or more hosts (102A-102N), the SRS (106), and the TKA (110). The TSS (108) is described in further detail below with respect to FIG. 5.

In one embodiment of the invention, the TKA (110) may be a cryptographic key provisioning service. The TKA (110) may be implemented using one or more servers (not shown). Each server may be a physical server (i.e., residing in a datacenter) or a virtual server (i.e., residing in a cloud computing environment). In one embodiment of the invention, the TKA (110) may be implemented using one or more computing systems similar to the exemplary computing system shown in FIG. 13. Further the TKA (110) may include functionality to fulfill key provision requests (described below) in accordance with one or more embodiments of the invention (see e.g., FIGS. 7A-8C). Moreover, the TKA (110) may be operatively connected to one or more hosts (102A-102N), the SSS (104), the SRS (106), and the TSS (108). The TKA (110) is described in further detail below with respect to FIG. 6.

While FIG. 1 shows a configuration of components, other system configurations may be used without departing from the scope of the invention. For example, the system (100) may accommodate multiple TSSs (108), thereby facilitating the replication and transfer of host-pertinent information from the SSS (104) to multiple secondary sites.

Figure 2:
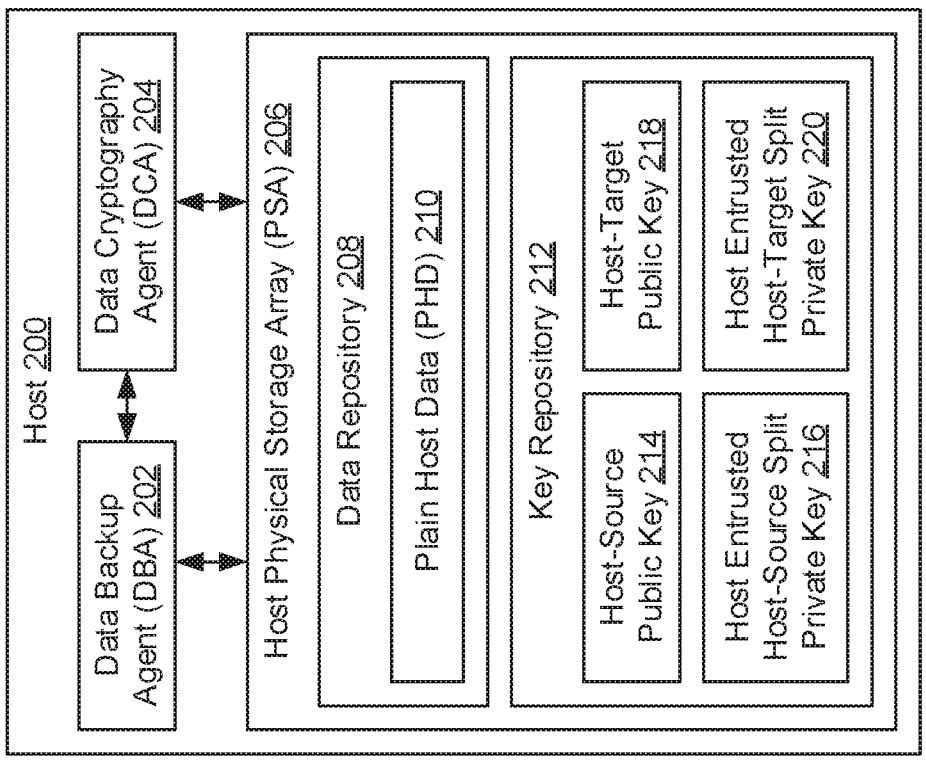
FIG. 2 shows a host in accordance with one or more embodiments of the invention.

FIG. 2 shows a host in accordance with one or more embodiments of the invention. The host (200) may include a data backup agent (DBA) (202), a data cryptography agent (DCA) (204), and a host physical storage array (PSA) (206). Each of these subcomponents is described below.

In one embodiment of the invention, the DBA (202) may be a computer program or process (i.e., an instance of a computer program) that executes on the underlying hardware of the host (200). Specifically, the DBA (202) may be a computer program or process tasked with managing data backup and recovery operations involving host data pertinent to the host (200). To that end, the DBA (202) may include functionality to: select or identify plain host data (PHD) (210) (described below) to back up and, thus, inform the DCA (204); obtain encrypted host data (EHD) (not shown) from the DCA (204); issue data consolidation requests, including the EHD, to the source storage system (SSS) (not shown); issue data retrieval requests, to the SSS or the target storage system (TSS), to re-obtain EHD during recovery operations; obtain decrypted host data (i.e., PHD (210)) from the DCA (204); and restore PHD on the host (200). One of ordinary skill will appreciate that the DBA (202) may perform other functionalities without departing from the scope of the invention.

In one embodiment of the invention, the DCA (204) may be a computer program or process (i.e., an instance of a computer program) that executes on the underlying hardware of the host (200). Specifically, the DCA (204) may be a computer program or process tasked with managing data encryption and encryption conversion operations involving host data pertinent to the host (200). To that end, the DCA (204) may include functionality to: obtain PHD (210) (described below) selected or identified by the DBA (202); encrypt the PHD (210) to obtain encrypted host data (EHD) (not shown); provide the EHD to the DBA (202); re-obtain EHD from the DBA (202) during recovery operations; decrypt the EHD to obtain PHD (210); and provide the PHD (210) to the DBA (202).

Furthermore, towards encrypting and/or decrypting data, the DCA (204) may employ any existing or future developed asymmetric cryptographic algorithm (e.g., the Rivest-Shamir-Adleman (RSA) public-key encryption algorithm) One of ordinary skill will appreciate that the DCA (204) may perform other functionalities without departing from the scope of the invention.

In one embodiment of the invention, the data encryption and encryption conversion operations involving host-pertinent data may be applied at a data deduplication chunk size level. A data deduplication chunk may be a fragment or a partition of an original (pre-deduplicated) data. Further, a data deduplication chunk may represent a unique byte pattern that may be identified repeatedly throughout the original data. The data deduplication chunk size may thus measure the size or granularity of the data deduplication chunks employed throughout the data deduplication process. By way of an example, the data deduplication chunk size may be expressed in bytes—e.g., kilobytes (KB), megabytes (MB), etc.

In one embodiment of the invention, the host PSA (206) may represent a collection of one or more physical storage devices and/or media on which various forms of information—pertinent to the host (200) and asymmetric cryptographic algorithm—may be consolidated. The one or more physical storage devices and/or media may or may not be of the same type. Further, the information consolidated in the host PSA (206) may be arranged by way of any storage mechanism (e.g., a filesystem, a collection of tables or records, etc.). In one embodiment of the invention, the host PSA (206) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the host PSA (206) may encompass a data repository (208). The data repository (208) may be a logical partition in the host PSA (206) that may be reserved for the consolidation of plain host data (PHD) (210). PHD (210) may represent any form of unencrypted host-pertinent data. Further, host-pertinent data may entail, for example, data generated and/or used by one or more computer programs (not shown) executing on the host (200), configuration data that may drive the behavior of one or more computer programs executing on the host (200), metadata describing other host-pertinent data, etc.

In one embodiment of the invention, the host PSA (206) may further encompass a key repository (212). The key repository (212) may be a logical partition in the host PSA (206) that may be reserved for the consolidation of various cryptographic keys. A cryptographic key may be a string of bits utilized by an asymmetric cryptographic algorithm to transform unencrypted data (e.g., PHD (210)) into encrypted data or vice versa. Cryptographic keys that which the key repository (212) may store may include, but are not limited to, a host-source public key (214), a host entrusted host-source split private key (216), a host-target public key (218), and a host entrusted host-target split private key (220). Each of these keys is described below.

In one embodiment of the invention, the host-source public key (214) may be a publicly-accessible encryption key, used by a asymmetric cryptographic algorithm on the host (200), to transform PHD (210) to encrypted host data (EHD) (not shown), where the EHD may be destined for consolidation on the source storage system (SSS) (see e.g., FIG. 1). On the other hand, the host entrusted host-source split private key (216) may be a confidential conversion key, entrusted to the host (200) and used by the asymmetric cryptographic algorithm thereon, to transform interim state host data (ISHD) (described below) to PHD (210), where the ISHD may be retrieved from the SSS. Further, the host-source public key (214) may be mathematically related to the host entrusted host-source split private key (216), a source entrusted host-source split private key (not shown), a source entrusted target-source split private key (not shown), and a target entrusted target-source split private key (not shown). That is, data encrypted with the host-source public key (214) may only be decrypted with the combination of the host entrusted source split private key (216) and the source entrusted host-source split private key (described below) or the combination of the source entrusted target-source split private key (described below) and the target entrusted target-source split private key (described below).

In one embodiment of the invention, ISHD (mentioned above) may entail encrypted host-pertinent data (i.e., EHD) that has been translated using one, but not both (or all), of the split private keys needed to transform the EHD to PHD (210). Each split private key may represent a share of a given private key from which the split private keys may be generated. Further, each share alone cannot fully decrypt data, which had been encrypted using a matching public key to the given private key. Instead, the combination of all shares or all split private keys are necessary to decrypt the encrypted data, which would recover the original, unencrypted data (i.e., PHD (210)). Conversely, in applying a split private key to EHD, an interim state of the data, which is still encrypted, is yielded. Only upon the application of the remaining one or more counterpart split private keys to the ISHD (i.e., the yielded interim state of the data) may the PHD (210) be obtained.

In one embodiment of the invention, the host-target public key (218) may be a publicly-accessible encryption key, used by an asymmetric cryptographic algorithm on the host (200), to transform PHD (210) to EHD (not shown), where the EHD may be destined for consolidation on the target storage system (TSS) (see e.g., FIG. 1). On the other hand, the host entrusted host-target split private key (220) may be a confidential conversion key, entrusted to the host (200) and used by the asymmetric cryptographic algorithm thereon, to transform ISHD to PHD (210), where the ISHD may be retrieved from the TSS. Further, the host-target public key (218) may be mathematically related to the host entrusted host-target split private key (220), and a target entrusted host-source split private key (not shown). That is, data encrypted with the host-target public key (218) may only be decrypted with the combination of the host entrusted host-target split private key (220) and the target entrusted host-target split private key (described below).

Figure 3:
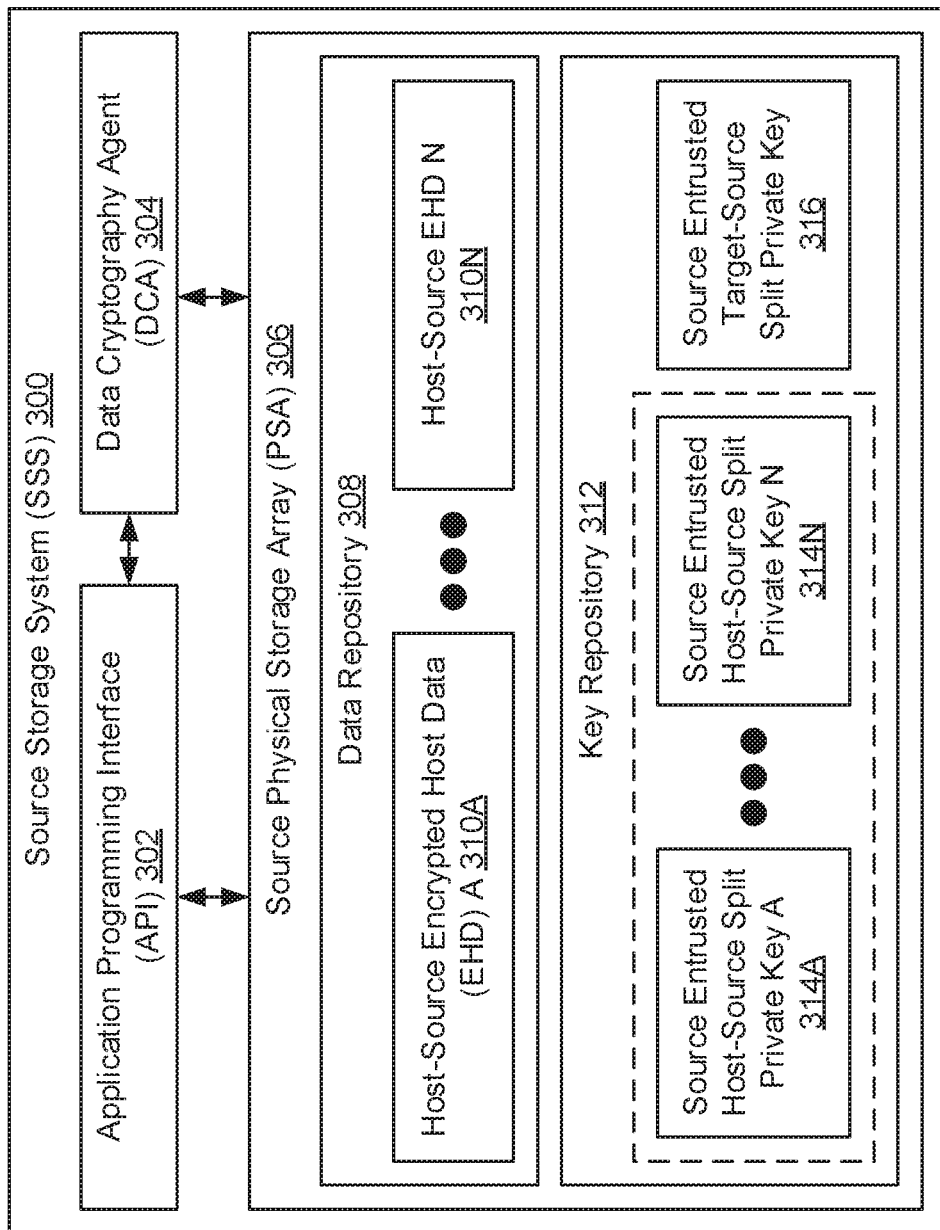
FIG. 3 shows a source storage system in accordance with one or more embodiments of the invention.

FIG. 3 shows a source storage system (SSS) in accordance with one or more embodiments of the invention. The SSS (300) may include an application programming interface (API) (302), a data cryptography agent (DCA) (304), and a source physical storage array (PSA) (306). Each of these subcomponents is described below.

In one embodiment of the invention, the API (302) may be a hardware and/or software implemented construct that employs a set of subroutine definitions, protocols, and/or tools for enabling communications between the SSS (300) and one or more external entities (e.g., one or more hosts (not shown), the storage replication system (SRS) (not shown), or the trusted key authority (TKA) (not shown)). The API (302) may include functionality to: receive and process data consolidation requests from one or more hosts (see e.g., FIG. 10A); receive and process data retrieval requests, with assistance from the DCA (304), from one or more hosts or the SRS (see e.g., FIG. 10B); and receive and store source entrusted host-source and host-target split private keys from the TKA. One of ordinary skill will appreciate that the API (302) may perform other functionalities without departing from the scope of the invention. By way of an example, the API (302) may be a web API that may be accessed through an assigned web address (e.g., a uniform resource locator (URL)) and a WAN (e.g., Internet) connection.

In one embodiment of the invention, the DCA (304) may be a computer program or process (i.e., an instance of a computer program) that executes on the underlying hardware of the SSS (300). Specifically, the DCA (304) may be a computer program or process tasked with managing data encryption conversion operations involving host data consolidated in the source PSA (306). To that end, the DCA (304) may include functionality to: obtain, from the source PSA (306), encrypted host data (EHD) (310A-310N) (described below) during the processing of received data retrieval requests from one or more hosts or the SRS; decrypt the EHD (310A-310N) to obtain interim state host data (ISHD) (not shown) (described below); and provide the ISHD to the API (302) for transmission towards a requesting host or the SRS. Furthermore, towards converting data, the DCA (304) may employ any existing or future developed asymmetric cryptographic algorithm (e.g., the Rivest-Shamir-Adleman (RSA) public-key encryption algorithm) One of ordinary skill will appreciate that the DCA (304) may perform other functionalities without departing from the scope of the invention.

In one embodiment of the invention, the source PSA (306) may represent a collection of one or more physical storage devices and/or media on which various forms of information—pertinent to one or more hosts (not shown) and the asymmetric cryptographic algorithm—may be consolidated. The one or more physical storage devices and/or media may or may not be of the same type. Further, the information consolidated in the source PSA (306) may be arranged by way of any storage mechanism (e.g., a filesystem, a collection of tables or records, etc.). In one embodiment of the invention, the source PSA (306) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the source PSA (306) may encompass a data repository (308). The data repository (308) may be a logical partition in the source PSA (306) that may be reserved for the consolidation of one or more host-source EHD (310A-310N). Each host-source EHD (310A-310N) may represent any form of encrypted host-pertinent data respective to a particular host. Further, each host-source EHD (310A-310N) may have been encrypted using a host-source public key (see e.g., FIG. 2). Moreover, host-pertinent data may entail, for example, data generated and/or used by one or more computer programs executing on a respective host, configuration data that may drive the behavior of one or more computer programs executing on a respective host, metadata describing other host-pertinent data, etc.

In one embodiment of the invention, the source PSA (306) may further encompass a key repository (312). The key repository (312) may be a logical partition in the source PSA (306) that may be reserved for the consolidation of various cryptographic keys. A cryptographic key may be a string of bits utilized by an asymmetric cryptographic algorithm to transform unencrypted data (e.g., PHD (not shown)) into encrypted data (e.g., host-source EHD (310A-310N)) or vice versa. Cryptographic keys that which the key repository (312) may store may include, but are not limited to, one or more source entrusted host-source split private keys (314A-314N), and a source entrusted target-source split private key (316). Each of these keys is described below.

In one embodiment of the invention, each source entrusted host-source split private key (314A-314N) may be a confidential conversion key, entrusted to the SSS (300) and used by an asymmetric cryptographic algorithm thereon, to transform a host-source EHD (310A-310N), for a particular host, to ISHD (not shown), which may subsequently be transmitted to the particular host during data recovery operations. Further, each source entrusted host-source split private key (314A-314N) may be mathematically related to a host-source public key (see e.g., FIG. 2), a host entrusted host-source split private key (see e.g., FIG. 2), the source entrusted target-source split private key (316), and a target entrusted target-source split private key (not shown). That is, data encrypted with the host-source public key (see e.g., FIG. 2) may only be decrypted with the combination of a source entrusted host-source split private key (314A-314N) and a compatible host entrusted host-source split private key (see e.g., FIG. 2) or the combination of the source entrusted target-source split private key (316) and the target entrusted target-source split private key (described below).

In one embodiment of the invention, the source entrusted target-source split private key (316) may be a confidential conversion key, entrusted to the SSS (300) and used by the asymmetric cryptographic algorithm thereon, to transform any host-source EHD (310A-310N), for any host, to ISHD (not shown), which may subsequently be transmitted to the SRS during encrypted data replication operations. Further, the source entrusted target-source split private key (316) may be mathematically related to a host-source public key (see e.g., FIG. 2), a target entrusted target-source split private key (not shown), a source entrusted host-source split private key (314A-314N), and a host entrusted host-source split private key (not shown). That is, data encrypted with the host-source public key (see e.g., FIG. 2) may only be decrypted with the combination of a source entrusted host-source split private key (314A-314N) and a compatible host entrusted host-source split private key (see e.g., FIG. 2) or the combination of the source entrusted target-source split private key (316) and the target entrusted target-source split private key (described below).

Figure 4:
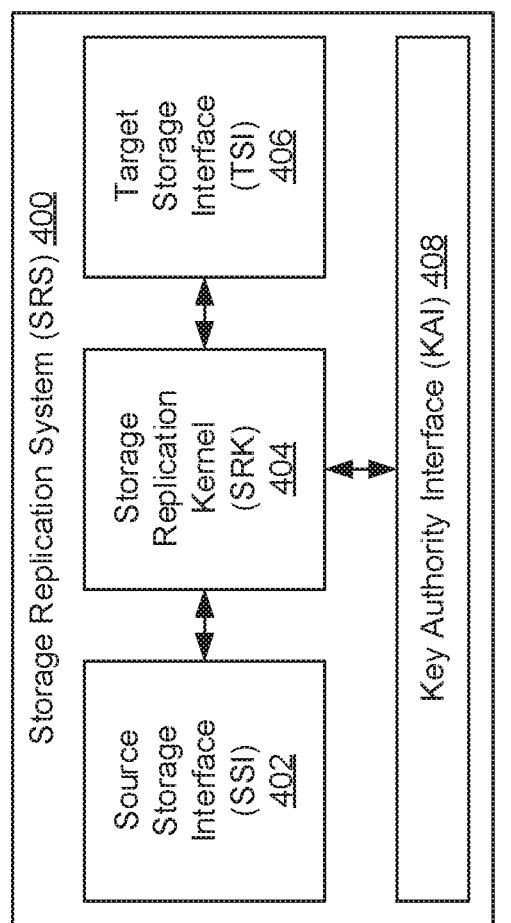
FIG. 4 shows a storage replication system in accordance with one or more embodiments of the invention.

FIG. 4 shows a storage replication system (SRS) in accordance with one or more embodiments of the invention. The SRS (400) may include a source storage interface (SSI) (402), a storage replication kernel (SRK) (404), a target storage interface (TSI) (406), and a key authority interface (KAI) (408). Each of these subcomponents is described below.

In one embodiment of the invention, the SSI (402) may be a hardware and/or software implemented construct that employs a set of subroutine definitions, protocols, and/or tools for enabling communications between the SRS (400) and the source storage system (SSS) (see e.g., FIG. 1). To that end, the SSI (402) may include functionality to: transmit data retrieval requests (described below), issued by the SRK (404), to the SSS; and, accordingly, receive data retrieval responses (described below), from the SSS, which are then provided to the SRK (404). One of ordinary skill will appreciate that the SSI (402) may perform other functionalities without departing from the scope of the invention. Further, by way of an example, the SSI (402) may be a web application programming interface (API) that may be accessed through an assigned web address (e.g., a universal resource locator (URL)) and a WAN (e.g., Internet) connection.

Figure 11A:
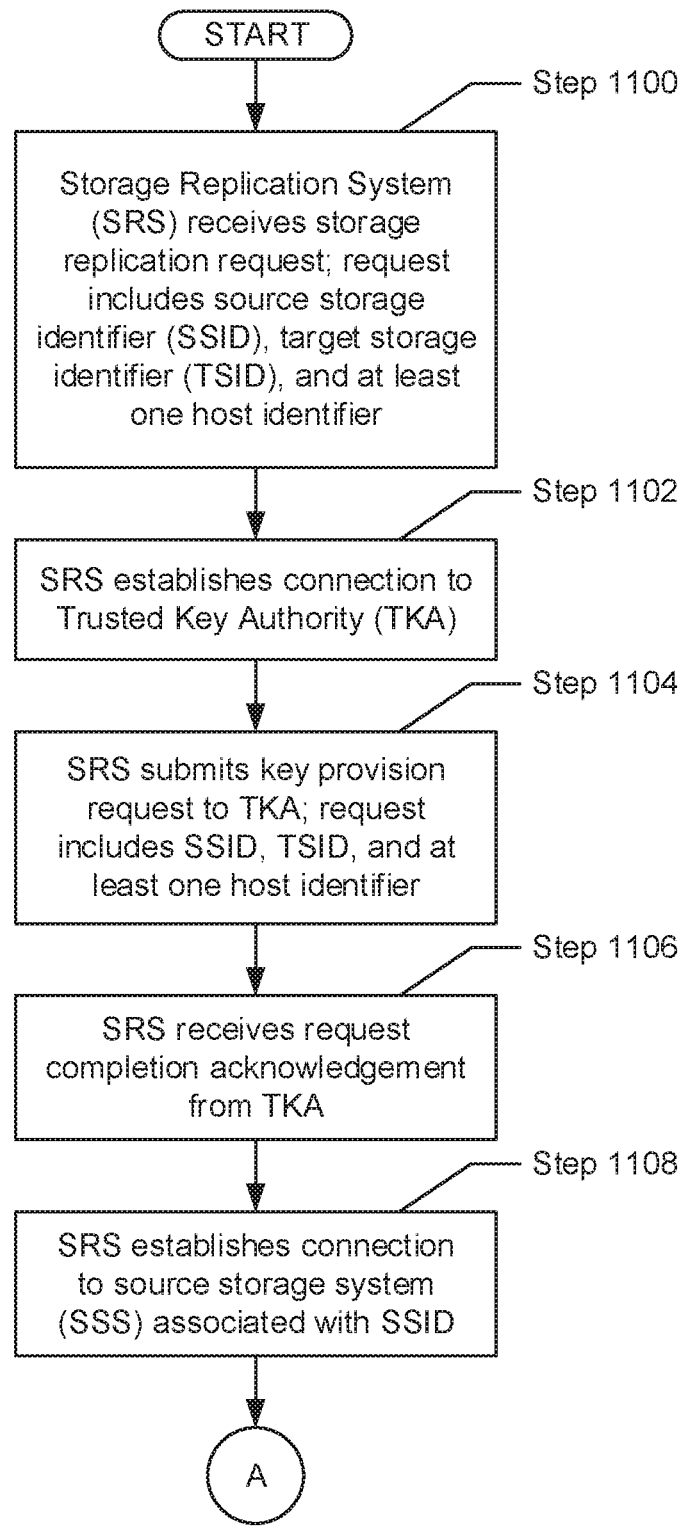
FIGS. 11A and 11B show flowcharts describing a method for fulfilling a storage replication request in accordance with one or more embodiments of the invention.
Figure 11B:
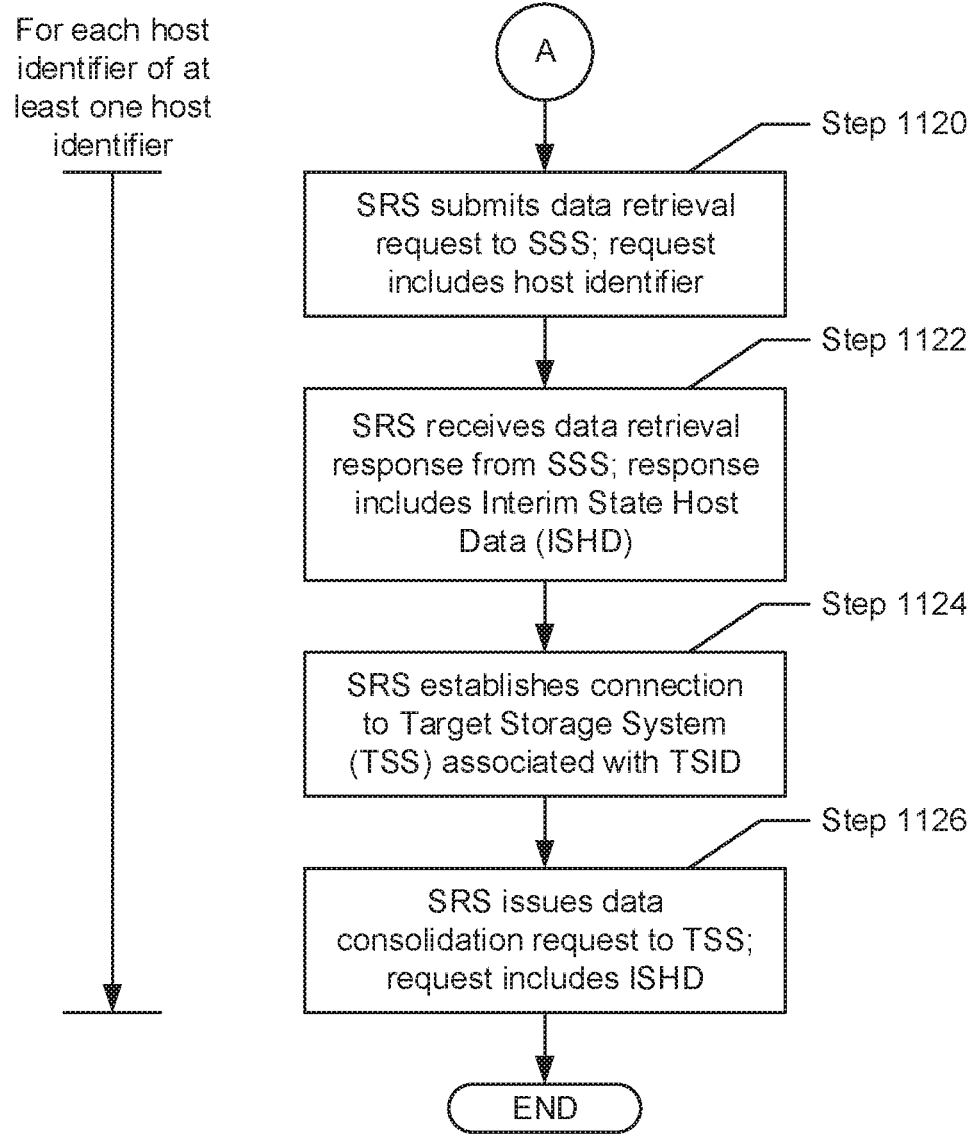

In one embodiment of the invention, the SRK (404) may be a computer processor, a computer program executing thereon, or a combination thereof, that represents the intelligence responsible for facilitating encrypted data replication and migration in accordance with one or more embodiments of the invention (see e.g., FIGS. 11A and 11B). To that end, the SRK (404) may include functionality to receive and process storage replication requests; and in processing storage replication requests: issue key provision requests, via the KAI (408), to the trusted key authority (TKA); receive request completion acknowledgements, via the KAI (408), from the TKA; issue data retrieval requests, via the SSI (402), to the SSS; receive data retrieval responses, via the SSI (402), from the SSS; and issue data consolidation requests, via the TSI (406), to the target storage system (TSS).

In one embodiment of the invention, the TSI (406) may be a hardware and/or software implemented construct that employs a set of subroutine definitions, protocols, and/or tools for enabling communications between the SRS (400) and TSS (see e.g., FIG. 1). To that end, the TSI (406) may include functionality to transmit data consolidation requests (described below), issued by the SRK (404), to the TSS. One of ordinary skill will appreciate that the TSI (406) may perform other functionalities without departing from the scope of the invention. Further, by way of an example, the TSI (406) may be a web API that may be accessed through an assigned web address (e.g., a URL) and a WAN (e.g., Internet) connection.

In one embodiment of the invention, the KAI (408) may be a hardware and/or software implemented construct that employs a set of subroutine definitions, protocols, and/or tools for enabling communications between the SRS (400) and the TKA (see e.g., FIG. 1). To that end, the KAI (408) may include functionality to: transmit key provision requests (described below), issued by the SRK (404), to the TKA; and, accordingly, receive request completion acknowledgements (described below) from the TKA, which are subsequently delegated to the SRK (404). One of ordinary skill will appreciate that the KAI (408) may perform other functionalities without departing from the scope of the invention. Further, by way of an example, the KAI (408) may be a web API that may be accessed through an assigned web address (e.g., a URL) and a WAN (e.g., Internet) connection.

Figure 5:
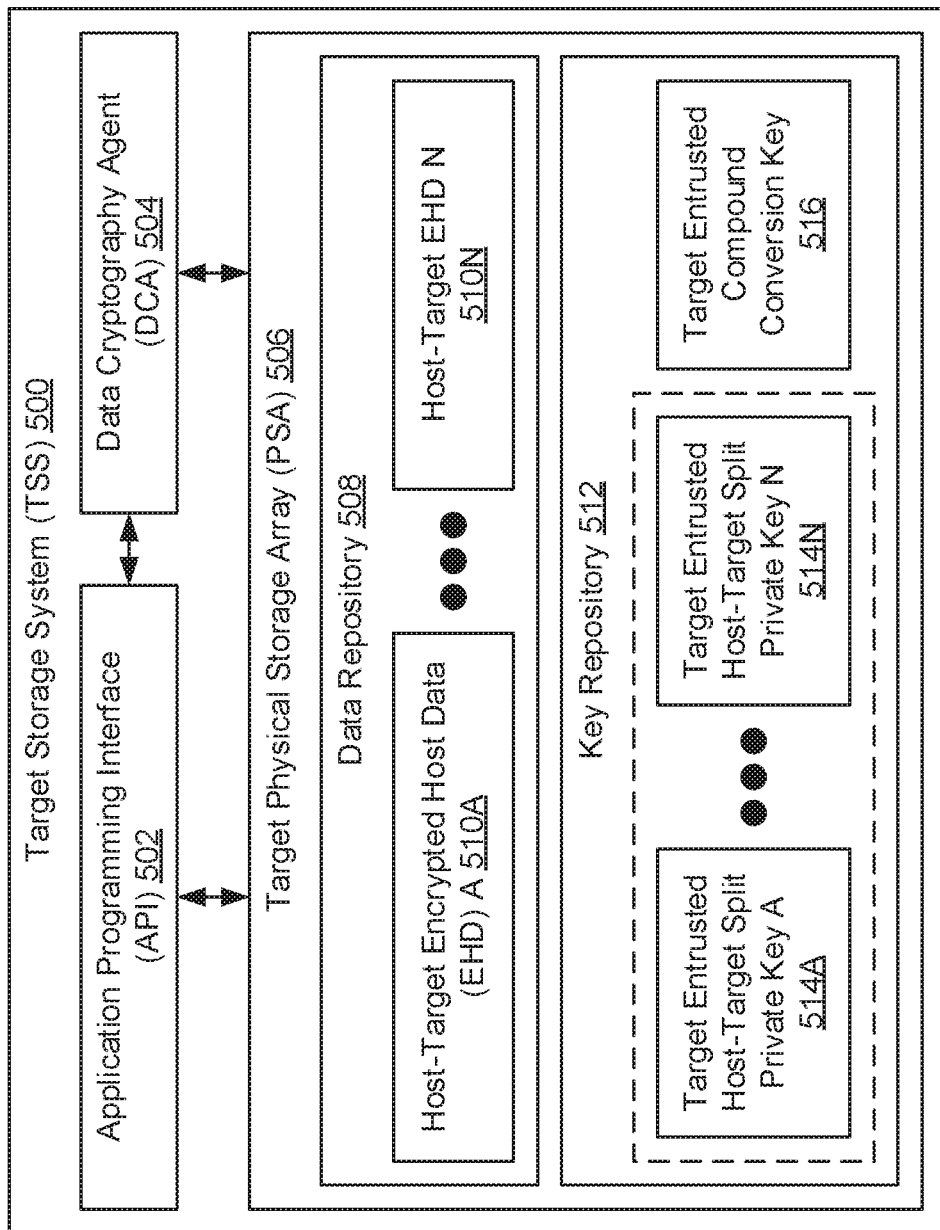
FIG. 5 shows a target storage system in accordance with one or more embodiments of the invention.

FIG. 5 shows a target storage system (TSS) in accordance with one or more embodiments of the invention. The TSS (500) may include an application programming interface (API) (502), a data cryptography agent (DCA) (504), and a target physical storage array (PSA) (506). Each of these subcomponents is described below.

In one embodiment of the invention, the API (502) may be a hardware and/or software implemented construct that employs a set of subroutine definitions, protocols, and/or tools for enabling communications between the TSS (500) and one or more external entities (e.g., one or more hosts (not shown), the storage replication system (SRS) (not shown), or the trusted key authority (TKA) (not shown)). The API (502) may include functionality to: receive and process data consolidation requests from the SRS; and receive and store target entrusted host-target private keys (514A-514N) (described below) and a target entrusted compound conversion key (516) (described below) from the TKA. One of ordinary skill will appreciate that the API (502) may perform other functionalities without departing from the scope of the invention. By way of an example, the API (502) may be a web API that may be accessed through an assigned web address (e.g., a uniform resource locator (URL)) and a WAN (e.g., Internet) connection.

In one embodiment of the invention, the DCA (504) may be a computer program or process (i.e., an instance of a computer program) that executes on the underlying hardware of the TSS (500). Specifically, the DCA (504) may be a computer program or process tasked with managing data encryption conversion operations involving host data transferred into the target PSA (506). To that end, the DCA (504)

may include functionality to: obtain interim state host data (ISHD) (not shown) (described below) from received data consolidation requests issued by the SRS; and translate the ISHD to obtain encrypted host data (EHD) (510A-510N) (described below). Furthermore, towards translating data from one encryption to another, the DCA (504) may employ any existing or future developed asymmetric cryptographic algorithm (e.g., the Rivest-Shamir-Adleman (RSA) public-key encryption algorithm) One of ordinary skill will appreciate that the DCA (504) may perform other functionalities without departing from the scope of the invention.

In one embodiment of the invention, the target PSA (506) may represent a collection of one or more physical storage devices and/or media on which various forms of information—pertinent to one or more hosts (not shown) and the asymmetric cryptographic algorithm—may be consolidated. The one or more physical storage devices and/or media may or may not be of the same type. Further, the information consolidated in the target PSA (506) may be arranged by way of any storage mechanism (e.g., a filesystem, a collection of tables or records, etc.). In one embodiment of the invention, the target PSA (506) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the target PSA (506) may encompass a data repository (508). The data repository (508) may be a logical partition in the target PSA (506) that may be reserved for the consolidation of one or more host-target EHD (510A-510N). Each host-target EHD (510A-510N) may represent any form of encrypted host-pertinent data respective to a particular host. Further, each host-target EHD (510A-510N) may have been encrypted using a host-target public key (see e.g., FIG. 2). Moreover, host-pertinent data may entail, for example, data generated and/or used by one or more computer programs executing on a respective host, configuration data that may drive the behavior of one or more computer programs executing on a respective host, metadata describing other host-pertinent data, etc.

In one embodiment of the invention, the target PSA (506) may further encompass a key repository (512). The key repository (512) may be a logical partition in the target PSA (506) that may be reserved for the consolidation of various cryptographic keys. A cryptographic key may be a string of bits utilized by an asymmetric cryptographic algorithm to transform unencrypted data (e.g., PHD (not shown)) into encrypted data (e.g., host-target EHD (510A-510N)) or vice versa. Cryptographic keys that which the key repository (512) may store may include, but are not limited to, one or more target entrusted host-target split private keys (514A-514N), and a target entrusted compound conversion key (516). Each of these keys is described below.

In one embodiment of the invention, each target entrusted host-target split private key (514A-514N) may be a confidential conversion key, entrusted to the TSS (500) and used by an asymmetric cryptographic algorithm thereon, to transform a host-target EHD (510A-510N), for a particular host, to ISHD (not shown), which may subsequently be transmitted to the particular host during data recovery operations. Further, each target entrusted host-target split private key (514A-514N) may be mathematically related to a host-target public key (not shown), and a host entrusted host-target split private key (not shown). That is, data encrypted with the host-target public key (see e.g., FIG. 2) may only be decrypted with the combination of a host entrusted host-target split private key (see e.g., FIG. 2) and a compatible target entrusted host-target split private key (514A-514N).

In one embodiment of the invention, the target entrusted compound conversion key (516) may be a fusion (or combination) of two cryptographic keys—i.e., a target entrusted target-source split private key (not shown) and a host-target public key (see e.g., FIG. 2). The target entrusted target-source split private key may be a confidential conversion key, entrusted to the TSS (500) and used by a cryptographic key thereon, to transform ISHD (transferred from the source storage system (SSS) via the SRS) to plain host data (PHD) (see e.g., FIG. 2). The host-target public key, on the other hand, may be a publicly-accessible encryption key, used by the asymmetric cryptographic algorithm, to transform the PHD (resulting from the first aforementioned transformation) to host-target EHD (510A-510N), which may subsequently be consolidated in the data repository (508). Accordingly, with the target entrusted compound conversion key (516), the asymmetric cryptographic algorithm on the TSS (500) may translate host-pertinent data from one encryption scheme to another without compromising or exposing the host-pertinent data.

Figure 6:
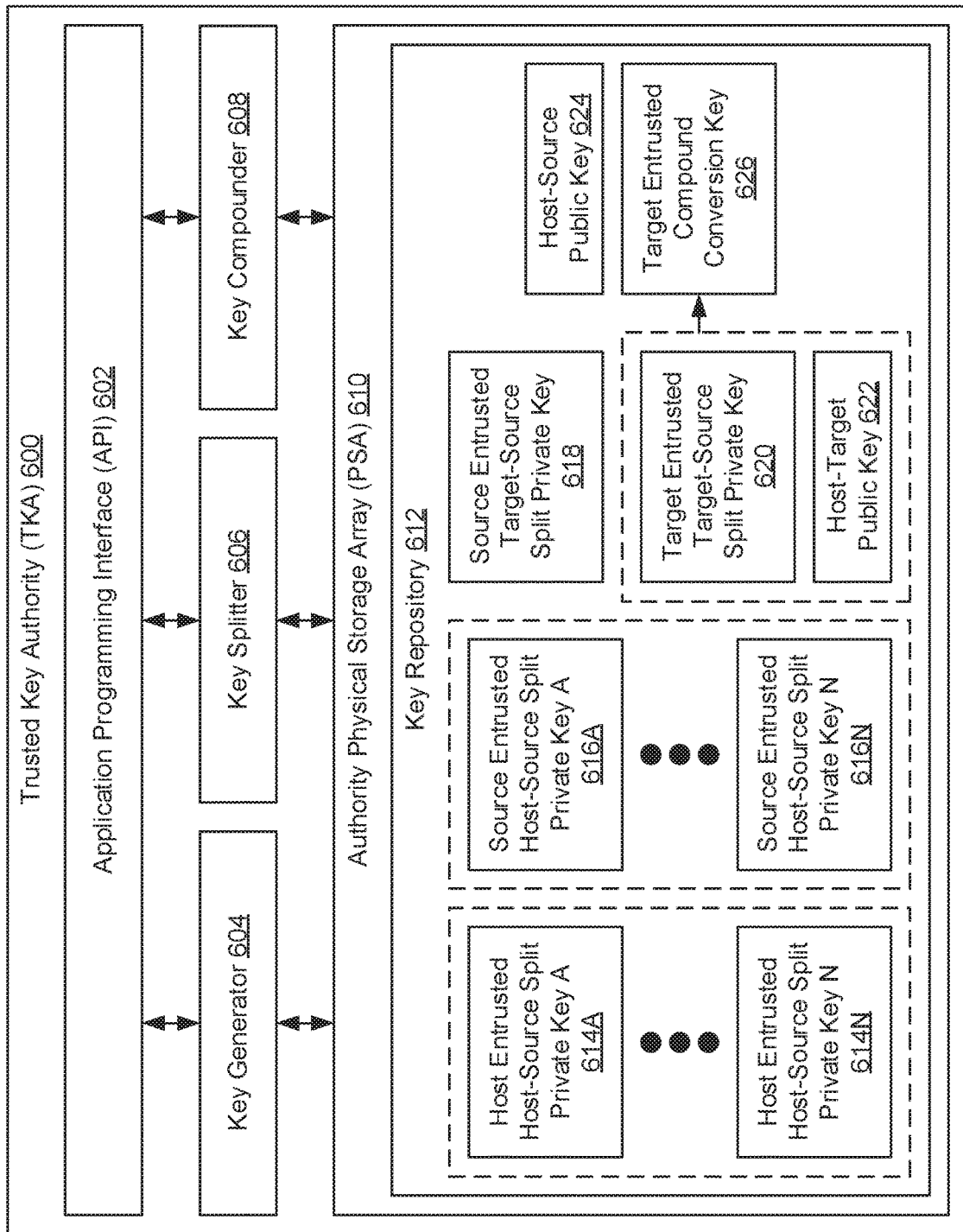
FIG. 6 shows a trusted key authority in accordance with one or more embodiments of the invention.

FIG. 6 shows a trusted key authority (TKA) in accordance with one or more embodiments of the invention. The TKA (600) may include an application programming interface (API) (602), a key generator (604), a key splitter (606), a key compounder (608), and an authority physical storage array (PSA) (610). Each of these subcomponents is described below.

In one embodiment of the invention, the API (602) may be a hardware and/or software implemented construct that employs a set of subroutine definitions, protocols, and/or tools for enabling communications between the TKA (600) and one or more external entities (e.g., one or more hosts (not shown), the source storage system (SSS) (not shown), the storage replication system (SRS) (not shown), or the target storage system (TSS) (not shown)). The API (602) may include functionality to: receive and coordinate the processing of key provision requests; establish connections with any of the aforementioned external entities; and transmit various generated cryptographic keys to the appropriate system (see e.g., FIG. 1) components. One of ordinary skill will appreciate that the API (602) may perform other functionalities without departing from the scope of the invention. By way of an example, the API (602) may be a web API that may be accessed through an assigned web address (e.g., a uniform resource locator (URL)) and a WAN (e.g., Internet) connection.

In one embodiment of the invention, the key generator (604) may be a computer program or process (i.e., an instance of a computer program) that executes on the underlying hardware of the TKA (600). Specifically, the key generator (604) may be a computer program or process tasked with the generation of various cryptographic key pairs. A cryptographic key pair may include a public key—used to encrypt data—and a matching private key, which may be used to decrypt any data that had been encrypted with the aforementioned public key. Further, towards generating the various cryptographic key pairs, the key generator (604) may employ any existing or future developed asymmetric cryptographic algorithm (e.g., the Rivest-Shamir-Adleman (RSA) public-key encryption algorithm).

In one embodiment of the invention, the key splitter (606) may be a computer program or process (i.e., an instance of a computer program) that executes on the underlying hardware of the TKA (600). Specifically, the key splitter (606) may be a computer program or process tasked with the generation of split private keys from a given private key (generated by the key generator (604)). A split private key may represent a share of the given private key from which the split private key is based. Each share alone cannot fully decrypt data (encrypted using the matching public key). Instead, a combination of all shares or all split private keys are necessary to decrypt the encrypted data. Further, towards generating split private keys from a given private key, the key splitter (606) may employ any existing or future developed key splitting or secret sharing technique. By way of an example, the key splitter (606) may employ the exclusive OR (XOR) method, which for generating two split private keys would entail: (i) obtaining a to-be-split private key; (ii) generating the first split private key using random bits, where the length of the first split private key matches the length of the to-be-split private key; and (iii) generating the second split private key by performing an XOR bitwise operation between the to-be-split private key and the first split private key.

In one embodiment of the invention, the key compounder (608) may be a computer program or process (i.e., an instance of a computer program) that executes on the underlying hardware of the TKA (600). Specifically, the key compounder (608) may be a computer program or process tasked with the generation of compound conversion keys. A compound conversion key may represent a fusion (or combination) of two or more cryptographic keys, thereby enabling an asymmetric cryptographic algorithm to translate data from one encryption scheme to another without compromising or exposing the data. Further, towards generating compound conversion keys, the key compounder (608) may employ different techniques specific to the asymmetric cryptographic algorithm utilized. For example, when considering RSA public-key encryption, public encryption and private decryption keys may be represented through exponents in a modular arithmetic expression. Accordingly, at least in this example, key compounding may entail multiplying the exponents representative of the two or more cryptographic keys used in the generation of the compound conversion key.

In one embodiment of the invention, the authority PSA (610) may represent a collection of one or more physical storage devices and/or media on which various forms of information—pertinent to the asymmetric cryptographic algorithm—may be consolidated. The one or more physical storage devices and/or media may or may not be of the same type. Further, the information consolidated in the authority PSA (610) may be arranged by way of any storage mechanism (e.g., a filesystem, a collection of tables or records, etc.). In one embodiment of the invention, the authority PSA (610) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the authority PSA (610) may encompass a key repository (612). The key repository (612) may be a logical partition in the authority PSA (610) that may be reserved for the consolidation of various cryptographic keys. A cryptographic key may be a string of bits utilized by an asymmetric cryptographic algorithm to transform unencrypted data (e.g., plain host data (PHD) (not shown)) into encrypted data (e.g., encrypted host data (EHD) (not shown)) or vice versa. Cryptographic keys that which the key repository (612) may store may include, but are not limited to, one or more host entrusted host-source split private keys (614A-14N), one or more source entrusted host-source split private keys (616A-616N), a source entrusted target-source split private key (618), a target entrusted target-source split private key (620), a host-target public key (622), a host-source public key (624), and a target entrusted compound conversion key (626). Each of these keys is described below.

In one embodiment of the invention, each host entrusted host-source split private key (614A-614N) may be a confidential conversion key, entrusted to a particular host and used by the asymmetric cryptographic algorithm thereon, to transform interim state host data (ISHD) (described below) to PHD, where the ISHD may be retrieved from the SSS. Further, each source entrusted host-source split private key (616A-616N) may be a confidential conversion key, entrusted to the SSS and used by an asymmetric cryptographic algorithm thereon, to transform a EHD, for a particular host, to ISHD (not shown), which may subsequently be transmitted to the particular host during data recovery operations. Moreover, the host-source public key (624) may be a publicly-accessible encryption key, used by an asymmetric cryptographic algorithm on any given host, to transform PHD to EHD, where the EHD may be destined for consolidation on the SSS.

In one embodiment of the invention, the source entrusted target-source split private key (618) may be a confidential conversion key, entrusted to the SSS and used by the asymmetric cryptographic algorithm thereon, to transform any host-source EHD (i.e., encrypted using the host-source public key (624)), for any host, to ISHD, which may subsequently be transmitted to the SRS during encrypted data replication and migration operations. Further, the target entrusted compound conversion key (626) may be a fusion (or combination) of two cryptographic keys—i.e., the target entrusted target-source split private key (620) and the host-target public key (622). The target entrusted target-source split private key (620) may be a confidential conversion key, entrusted to the TSS and used by a cryptographic key thereon, to transform ISHD (transferred from the SSS via the SRS) to PHD. The host-target public key (622), on the other hand, may be a publicly-accessible encryption key, used by the asymmetric cryptographic algorithm, to transform the PHD (resulting from the first aforementioned transformation) to EHD, which may subsequently be consolidated in a data repository residing on the TSS.

Figure 7A:
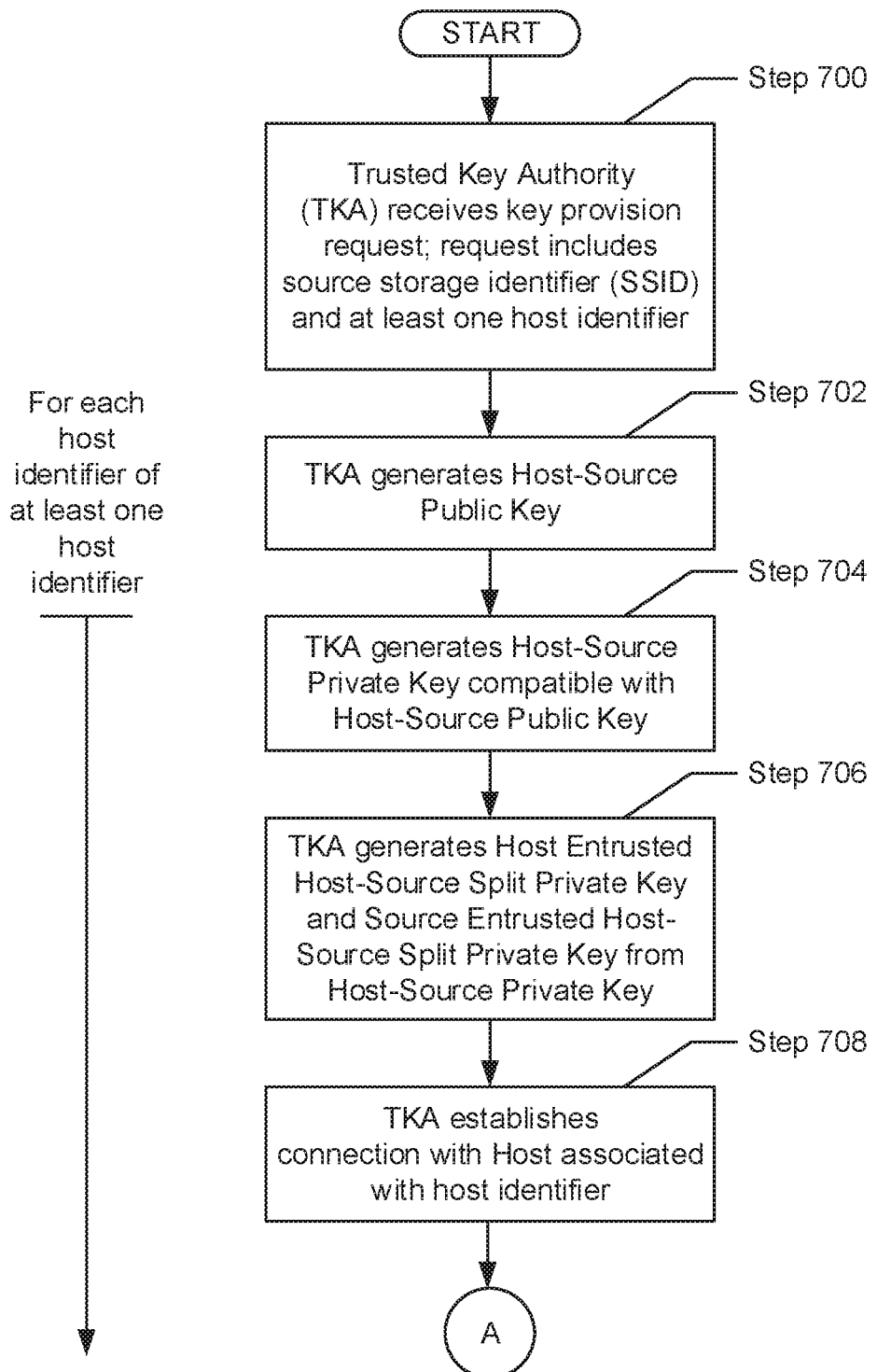
FIGS. 7A and 7B show flowcharts describing a method for fulfilling a key provision request in accordance with one or more embodiments of the invention.
Figure 7B:
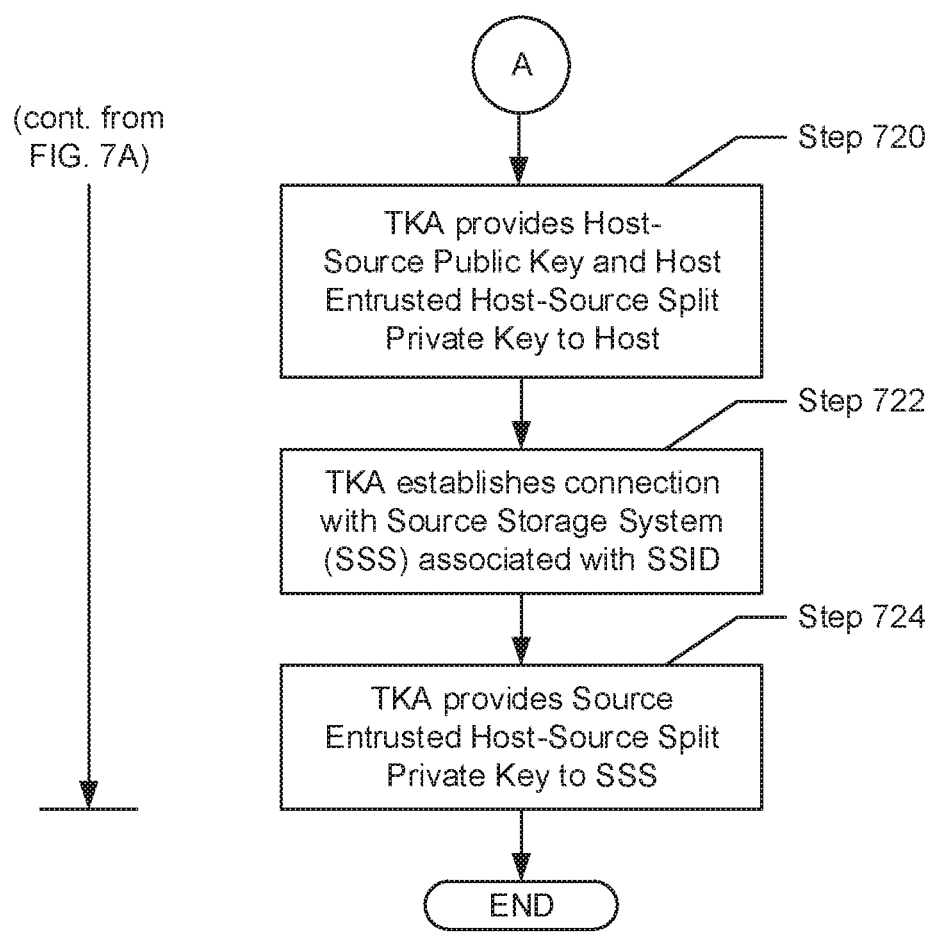

FIGS. 7A and 7B show flowcharts describing a method for fulfilling a key provision request in accordance with one or more embodiments of the invention. The various steps outlined below may be performed by the trusted key authority (TKA) (see e.g., FIG. 6). Further, while the various steps in the flowcharts are presented and described sequentially, one of ordinary skill will appreciate that some or all steps may be executed in different orders, may be combined or omitted, and some or all steps may be executed in parallel.

Turning to FIG. 7A, in Step 700, a key provision request is received. In one embodiment of the invention, the key provision request may have been issued by an administrator of one or more components of the system shown in FIG. 1. Further, the key provision request may include a source storage identifier (SSID) associated with a source storage system (SSS) and at least one host identifier associated with at least one host that may have data consolidated on the SSS.

In Step 702, in response to the key provision request (received in Step 700), a host-source public key is generated. In one embodiment of the invention, generation of the host-source public key may entail employing any existing or future developed asymmetric cryptographic algorithm (e.g., the Rivest-Shamir-Adleman (RSA) public-key encryption algorithm) Further, the host-source public key may be a publicly-accessible encryption key, which may be purposed towards encrypting plain host data (PHD) (described above), from any host, into encrypted host data (EHD) (described above) that may subsequently be consolidated onto the SSS.

Hereinafter, the following subset of steps (i.e., Step 704 through Step 724) are to be performed for each host identifier of the at least one host identifier (received in Step 700). With that said, in Step 704, a host-source private key is generated for a host associated with the host identifier. In one embodiment of the invention, the host-source private key may be a counterpart to the host-source public key (generated in Step 702). Accordingly, the host-source private key may be mathematically related to the host-source public key and, therefore, capable of decrypting EHD, which may result from the encryption of PHD using the host-source public key.

In Step 706, a host entrusted host-source split private key and a source entrusted host-source split private key are generated. In one embodiment of the invention, the host entrusted and source entrusted host-source split private keys may be generated from the host-source private key (generated in Step 704). Further, generation of the host entrusted and source entrusted host-source split private keys may entail any existing or future developed cryptographic key splitting technique (e.g., the XOR method (described above)). Moreover, the host entrusted host-source split private key may be a confidential conversion key, entrusted to the host associated with the host identifier and used by an asymmetric cryptographic algorithm thereon, to transform interim state host data (ISHD) (described above) to PHD, where the ISHD may be retrieved from the SSS. The source entrusted host-source split private key, on the other hand, may be a confidential conversion key, entrusted to the SSS and used by an asymmetric cryptographic algorithm thereon, to transform an EHD, for a particular host, to ISHD, which may subsequently be transmitted to the particular host during data recovery operations.

In Step 708, a connection with the host, associated with the host identifier, is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

Turning to FIG. 7B, in Step 720, through the connection (established in Step 708), the host-source public key (generated in Step 702) and the host entrusted host-source split private key (generated in Step 706) are transmitted to the host associated with the host identifier. In turn, in one embodiment of the invention, the host may store the aforementioned cryptographic keys until they are needed to encrypt PHD into EHD and translate ISHD into PHD, respectively.

In Step 722, a connection with the SSS, associated with the SSID (received in Step 700), is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

In Step 724, through the connection (established in Step 722), the source entrusted host-source split private key (generated in Step 706) is transmitted to the SSS. In turn, in one embodiment of the invention, the SSS may store the aforementioned cryptographic key until it is needed to translate encrypted host data (EHD) into interim state host data (ISHD), which may be provided to the host (associated with the host identifier) during data recovery operations.

Figure 8A:
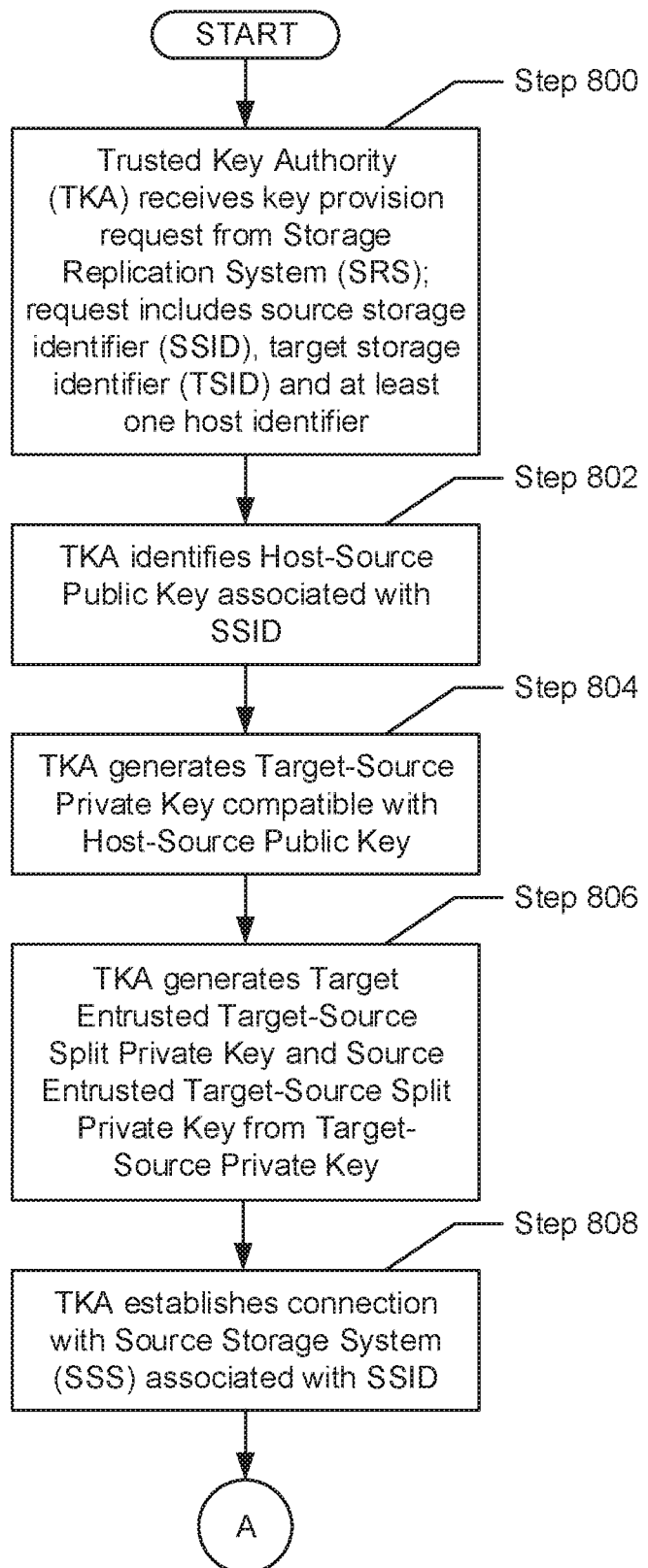
FIGS. 8A-8C show flowcharts describing a method for fulfilling a key provision request in accordance with one or more embodiments of the invention.
Figure 8B:
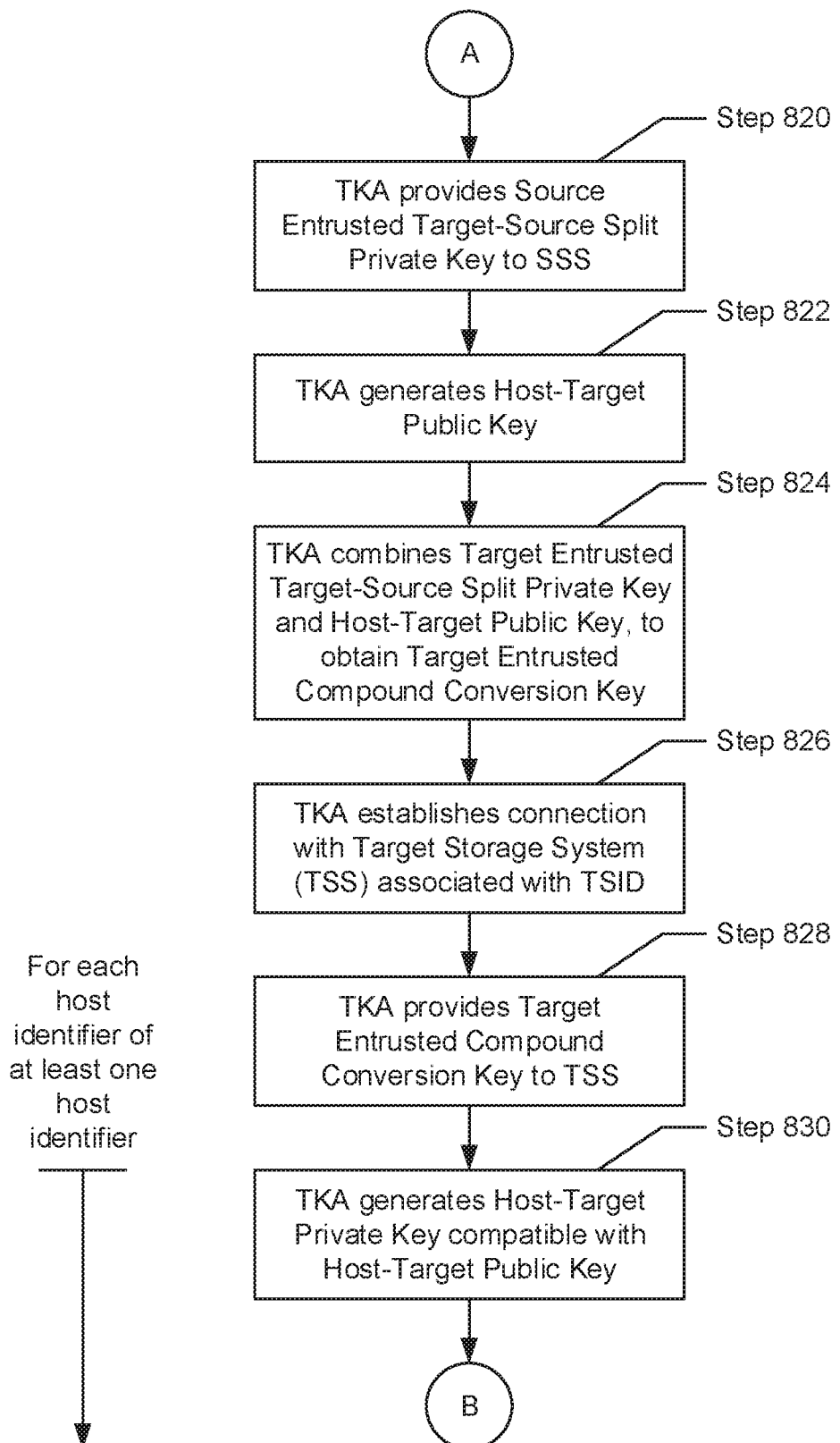
Figure 8C:
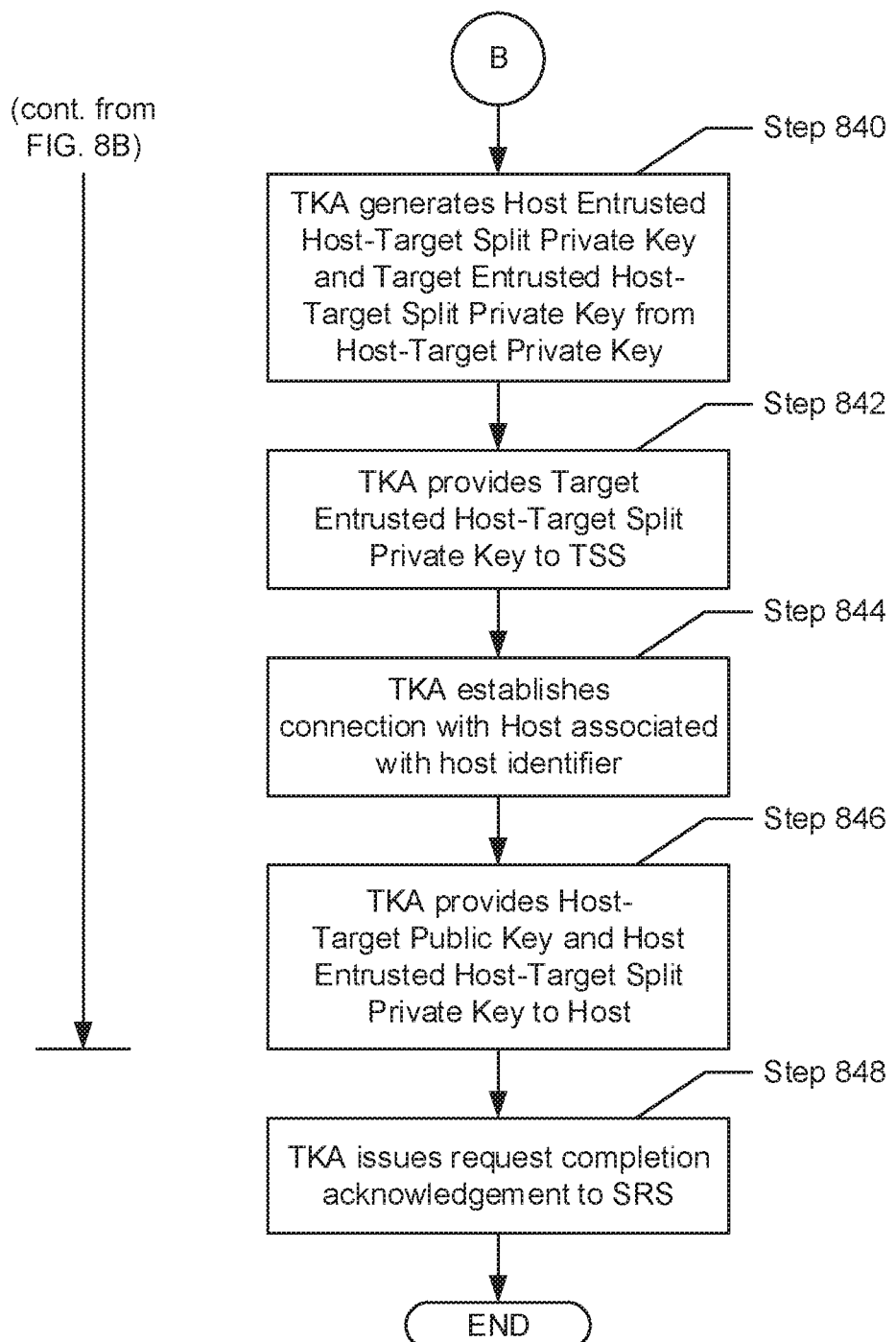

FIGS. 8A-8C show flowcharts describing a method for fulfilling a key provision request in accordance with one or more embodiments of the invention. The various steps outlined below may be performed by the trusted key authority (TKA) (see e.g., FIG. 6). Further, while the various steps in the flowcharts are presented and described sequentially, one of ordinary skill will appreciate that some or all steps may be executed in different orders, may be combined or omitted, and some or all steps may be executed in parallel.

Turning to FIG. 8A, in Step 800, a key provision request is received. In one embodiment of the invention, the key provision request may have been issued by the storage replication system (SRS) during an encrypted data replication and migration operation. Further, the key provision request may include a source storage identifier (SSID) associated with a source storage system (SSS), a target storage identifier (TSID) associated with a target storage system (TSS), and at least one host identifier associated with at least one host that may have data consolidated on the SSS.

In Step 802, in response to the key provision request (received in Step 800), a host-source public key is identified. In one embodiment of the invention, the host-source public key may be associated with the SSID. Thereafter, in Step 804, a target-source private key is generated. In one embodiment of the invention, the target-source private key may be a counterpart to the host-source public key (identified in Step 802). Accordingly, the target-source private key may be mathematically related to the host-source public key and, therefore, capable of decrypting host-source encrypted host data (EHD), which may result from the encryption of plain host data (PHD) using the host-source public key.

In Step 806, a target entrusted target-source split private key and a source entrusted target-source split private key are generated. In one embodiment of the invention, the target entrusted and source entrusted target-source split private keys may be generated from the target-source private key (generated in Step 804). Further, generation of the target entrusted and source entrusted target-source split private keys may entail any existing or future developed cryptographic key splitting or secret sharing technique (e.g., the XOR method (described above)). Moreover, the source entrusted target-source split private key may be a confidential conversion key, entrusted to the SSS and used by an asymmetric cryptographic algorithm thereon, to transform host-source EHD, for any host, to interim state host data (ISHD), which may subsequently be transmitted to the TSS, via the SRS, during encrypted data replication and migration operations. The target entrusted target-source split private key, on the other hand, may be a confidential conversion key that may be used as a constituent cryptographic key in the generation of a compound conversion key (described above).

In Step 808, a connection with the SSS, associated with the SSID (received in Step 800), is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

Turning to FIG. 8B, in Step 820, through the connection (established in Step 808), the source entrusted target-source split private key (generated in Step 806) is transmitted to the SSS. In turn, in one embodiment of the invention, the SSS may store the aforementioned cryptographic key until it is needed to translate host-source EHD, belonging to any given host, into ISHD, which may subsequently be provided the SRS during encrypted data replication and migration operations.

In Step 822, a host-target public key is generated. In one embodiment of the invention, generation of the host-target public key may entail employing any existing or future developed asymmetric cryptographic algorithm (e.g., the Rivest-Shamir-Adleman (RSA) public-key encryption algorithm) Further, the host-target public key may be a publicly-accessible encryption key, which may be purposed towards encrypting PHD, from any host, into host-target EHD that may subsequently be consolidated onto the TSS.

In Step 824, a target entrusted compound conversion key is generated or obtained. In one embodiment of the invention, the target entrusted compound conversion key may result from a fusion (or combination) of two cryptographic keys—i.e., the target entrusted target-source split private key (generated in Step 806) and the host-target public key (generated in Step 822). Further, generation of the target entrusted compound conversion key may entail employing different techniques specific to the asymmetric cryptographic algorithm utilized. For example, when considering RSA public-key encryption, public encryption and private decryption keys may be represented through exponents in a modular arithmetic expression. Accordingly, at least in this example, key compounding may entail multiplying the exponents representative of the two or more cryptographic keys used in the generation of the compound conversion key.

In Step 826, a connection with the TSS, associated with the TSID (received in Step 800), is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

In Step 828, through the connection (established in Step 826), the target entrusted compound conversion key (generated in Step 824) is transmitted to the TSS. In turn, in one embodiment of the invention, the TSS may store the aforementioned cryptographic key until it is needed to translate ISHD, migrating from the SSS, into host-target EHD, which may subsequently be consolidated on the TSS.

Hereinafter, the following subset of steps (i.e., Step 830 through Step 846) are to be performed for each host identifier of the at least one host identifier (received in Step 800). With that said, in Step 830, a host-target private key is generated for a host associated with the host identifier. In one embodiment of the invention, the host-target private key may be a counterpart to the host-target public key (generated in Step 822). Accordingly, the host-target private key may be mathematically related to the host-target public key and, therefore, capable of decrypting host-target EHD, which may result from the encryption of PHD using the host-target public key.

Turning to FIG. 8C, in Step 840, a host entrusted host-target split private key and a target entrusted host-target split private key are generated. In one embodiment of the invention, the host entrusted and target entrusted host-target split private keys may be generated from the host-target private key (generated in Step 830). Further, generation of the host entrusted and source entrusted host-target split private keys may entail any existing or future developed cryptographic key splitting technique (e.g., the XOR method (described above)). Moreover, the host entrusted host-target split private key may be a confidential conversion key, entrusted to the host associated with the host identifier and used by an asymmetric cryptographic algorithm thereon, to transform ISHD to PHD, where the ISHD may be retrieved from the TSS. The target entrusted host-target split private key, on the other hand, may be a confidential conversion key, entrusted to the TSS and used by an asymmetric cryptographic algorithm thereon, to transform a host-target EHD, for a particular host, to ISHD, which may subsequently be transmitted to the particular host during data recovery operations.

In Step 842, through the connection (established in Step 826), the target entrusted host-target split private key (generated in Step 840) is transmitted to the TSS. In turn, in one embodiment of the invention, the TSS may store the aforementioned cryptographic key until it is needed to translate host-target EHD, pertaining to the host (associated with the host identifier), into ISHD, which may be provided to the host (associated with the host identifier) during data recovery operations.

In Step 844, a connection with the host, associated with the host identifier, is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

In Step 846, through the connection (established in Step 844), the host-target public key (generated in Step 822) and the host entrusted host-target split private key (generated in Step 840) are transmitted to the host associated with the host identifier. In turn, in one embodiment of the invention, the host may store the aforementioned cryptographic keys until they are needed to encrypt PHD to host-target EHD and translate ISHD, received from the TSS, to PHD, respectively.

In Step 848, after the key provision request (received in Step 800) has been fulfilled, a request completion acknowledgement is issued. In one embodiment of the invention, the request completion acknowledgement may be provided to the SRS; and may entail a message that may indicate a completion in the processing of the key provision request.

Figure 9:
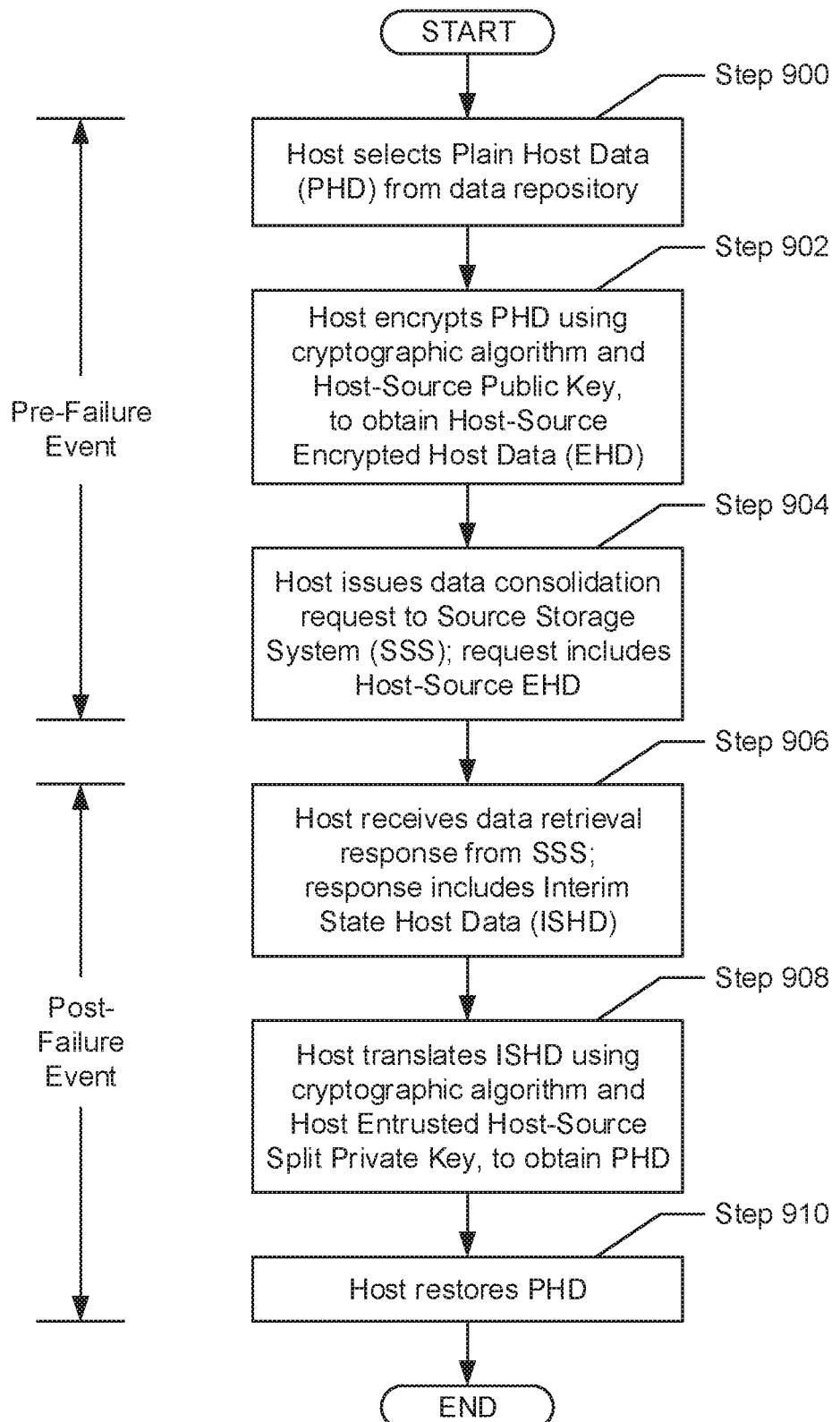
FIG. 9 shows a flowchart describing a method for handling host data before and after a failure event in accordance with one or more embodiments of the invention.

FIG. 9 shows a flowchart describing a method for handling host data before and after a failure event in accordance with one or more embodiments of the invention. The various steps outlined below may be performed by a host (see e.g., FIG. 2). Further, while the various steps in the flowcharts are presented and described sequentially, one of ordinary skill will appreciate that some or all steps may be executed in different orders, may be combined or omitted, and some or all steps may be executed in parallel.

Turning to FIG. 9, the following subset of steps (i.e., Step 900 through Step 904) may typically transpire before the occurrence of a failure event on a host. In one embodiment of the invention, a failure event may refer to an incident that results in the inoperability of the host, or triggers the stray of host behavior from the norm. Further, the aforementioned incident may be caused by various reasons. By way of an example, a failure event may come to pass due to a successful cyber security attack on the host, which may introduce hardware failure, data corruption, and/or software anomalies thereon.

With the above in mind, in Step 900, plain host data (PHD) is selected. In one embodiment of the invention, PHD may represent any form of unencrypted host-pertinent data. Further, host-pertinent data may entail, for example, data generated and/or used by one or more computer programs executing on the host, configuration data that may drive the behavior of one or more computer programs executing on the host, metadata describing other host-pertinent data, etc. Further, selection of the PHD may be based on a data backup schedule configured by a user and/or administrator of the host.

In Step 902, the PHD (selected in Step 900) is encrypted. In one embodiment of the invention, encryption of the PHD may entail employing any existing or future developed asymmetric cryptographic algorithm (e.g., the Rivest-Shamir-Adleman (RSA) public-key encryption algorithm). Further, through the asymmetric cryptographic algorithm, the PHD may be encrypted using a host-source public key. The host-source public key may be a publicly-accessible encryption key, which may be used to transform the PHD into host-source encrypted host data (EHD).

In Step 904, a data consolidation request is issued. In one embodiment of the invention, the data consolidation request may be submitted to the source storage system (SSS) (see e.g., FIG. 1) and may pertain to retention of request contents on the SSS. Further, the request contents may include the host-source EHD (obtained through encrypting the PHD in Step 902).

Hereinafter, the remaining subset of steps (i.e., Step 906 through Step 910) may typically transpire after the occurrence of a failure event on the host. That is, these remaining subset of steps may be triggered during data recovery operations. With this in mind, in Step 906, a data retrieval response is received from the SSS. In one embodiment of the invention, the data retrieval response may represent a reply to a data retrieval request, which may have previously been submitted to the SSS by the host or by a computing system (see e.g., FIG. 13) operated by an administrator of one or more system components shown in FIG. 1. Further, the data retrieval response may include interim state host data (ISHD) (described above).

In Step 908, the ISHD (received in Step 906) is translated. In one embodiment of the invention, translation of the ISHD may entail employing any existing or future developed asymmetric cryptographic algorithm (e.g., the Rivest-Shamir-Adleman (RSA) public-key encryption algorithm) Further, through the asymmetric cryptographic algorithm, the ISHD may be translated using a host entrusted host-source split private key. The host entrusted host-source split private key may be a confidential conversion key entrusted to the host and used to transform the ISHD into PHD. Thereafter, in Step 910, the PHD (obtained through the translation of ISHD in Step 908) is restored on the host.

Figure 10A:
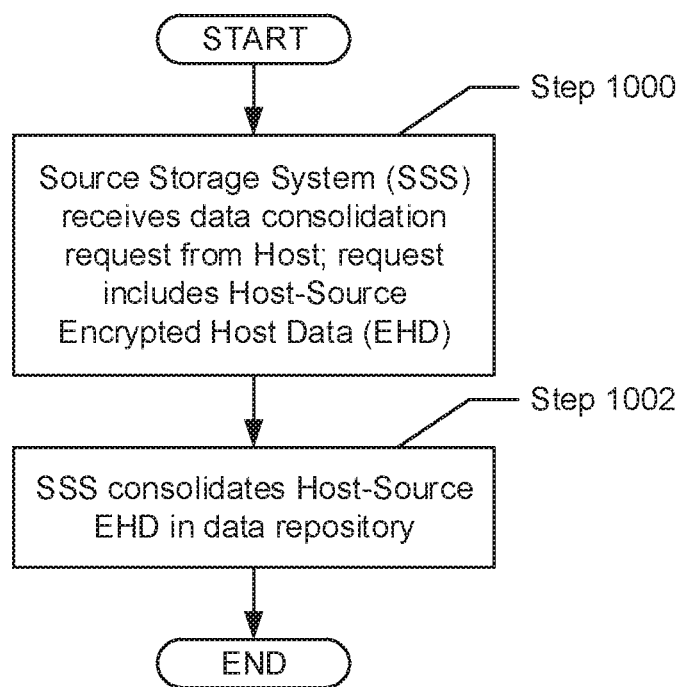
FIG. 10A shows a flowchart describing a method for fulfilling a data consolidation request in accordance with one or more embodiments of the invention.

FIG. 10A shows a flowchart describing a method for fulfilling a data consolidation request in accordance with one or more embodiments of the invention. The various steps outlined below may be performed by the source storage system (SSS) (see e.g., FIG. 3). Further, while the various steps in the flowcharts are presented and described sequentially, one of ordinary skill will appreciate that some or all steps may be executed in different orders, may be combined or omitted, and some or all steps may be executed in parallel.

Turning to FIG. 10A, in Step 1000, a data consolidation request is received. In one embodiment of the invention, the data consolidation request may have been submitted by a host (see e.g., FIG. 1) that may be using the SSS for data backup, archiving, and/or disaster recovery purposes. Further, the data consolidation request may pertain to the retention of host-pertinent data (described above). Accordingly, the data consolidation request may include host-source encrypted host data (EHD) associated with a particular host, where the host-source EHD may represent plain host data (PHD) (described above) that had been encrypted using a host-source public key entrusted to the particular host.

In Step 1002, the host-source EHD (received in Step 1000) is consolidated. Specifically, in one embodiment of the invention, the host-source EHD may be stored in a data repository, which may be representative of a logical partition in physical storage residing on the SSS.

Figure 10B:
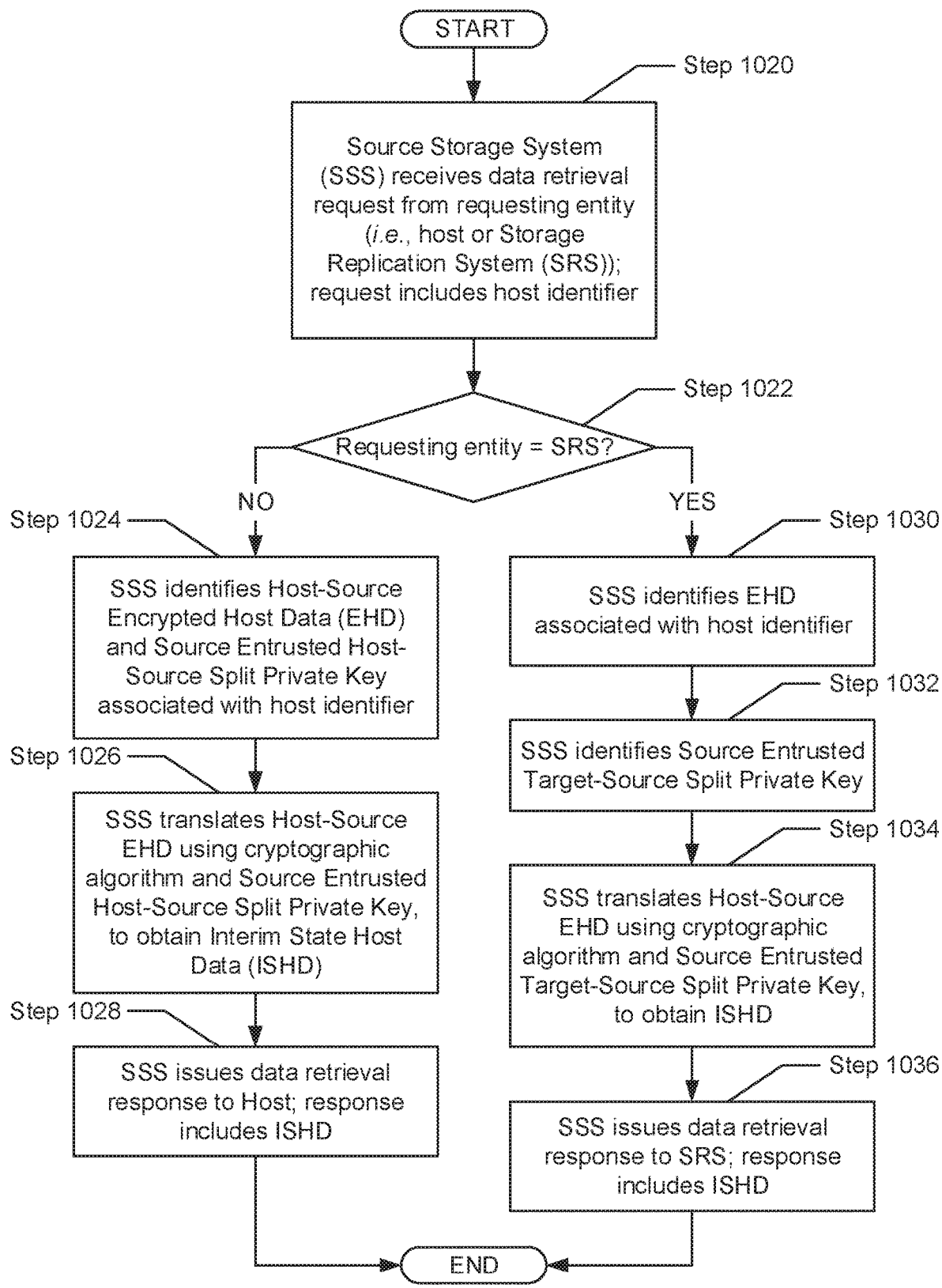
FIG. 10B shows a flowchart describing a method for fulfilling a data retrieval request in accordance with one or more embodiments of the invention.

FIG. 10B shows a flowchart describing a method for fulfilling a data retrieval request in accordance with one or more embodiments of the invention. The various steps outlined below may be performed by the source storage system (SSS) (see e.g., FIG. 3). Further, while the various steps in the flowcharts are presented and described sequentially, one of ordinary skill will appreciate that some or all steps may be executed in different orders, may be combined or omitted, and some or all steps may be executed in parallel.

Turning to FIG. 10B, in Step 1020, a data retrieval request is received. In one embodiment of the invention, the data retrieval request may have been submitted by a requesting entity, which may be a host (see e.g., FIG. 1) or the storage replication system (SRS). Further, the data retrieval request may pertain to the retrieval of host-pertinent data (described above) consolidated on the SSS. Accordingly, the data retrieval request may include a host identifier associated with a particular host and, therefore, the host-pertinent data sought to be retrieved.

In Step 1022, a determination is made as to whether the requesting entity, whom had submitted the data retrieval request (received in Step 1020), is the SRS. The determination may entail examining header information embedded in data packets used to communicate the data retrieval request from the requesting entity to the SSS. The header information may include identification information (e.g., an Internet Protocol (IP) address, a media access control (MAC) address, etc.) unique to the requesting entity, which may be extracted therefrom and compared to a known identifiers to identify the requesting entity. Accordingly, in one embodiment of the invention, if the requesting entity is determined to be a host, then the process may proceed to Step 1024. On the other hand, in another embodiment of the invention, if the requesting entity is alternatively determined to be the SRS, then the process may alternatively proceed to Step 1030.

In Step 1024, after determining (in Step 1022) that the requesting entity is a particular host, host-source encrypted host data (EHD) and a source entrusted host-source split private key are identified. In one embodiment of the invention, the host-source EHD may represent host-pertinent data (described above) that had been consolidated on the SSS, where the host-source EHD may be identified using the host identifier (received in Step 1020) and, therefore, the host-source EHD may be associated with the particular host (i.e., requesting entity). Further, the source entrusted host-source split private key may be identified, from a pool of one or more source entrusted host-source split private keys stored in a key repository on the SSS (see e.g., FIG. 3), using the host identifier. The identified source entrusted host-source split private key may be a confidential conversion key entrusted to the SSS, which in combination with a host entrusted host-source split private key (entrusted to the particular host), may fully decrypt any host-source EHD associated with the particular host.

In Step 1026, the host-source EHD (identified in Step 1024) is translated to obtain interim state host data (ISHD). In one embodiment of the invention, translation of the host-source EHD may entail employing any existing or future developed asymmetric cryptographic algorithm (e.g., the Rivest-Shamir-Adleman (RSA) public-key encryption algorithm) Further, through the asymmetric cryptographic algorithm, the host-source EHD may be translated using a source entrusted host-source split private key. The source entrusted host-source split private key may be a confidential conversion key entrusted to the SSS and used to transform the host-source EHD into ISHD (described below).

In one embodiment of the invention, ISHD may entail encrypted host-pertinent data (i.e., EHD) that has been translated using one, but not both (or all), of the split private keys needed to transform the EHD to plain host data (PHD) (i.e., unencrypted host-pertinent data). Each split private key may represent a share of a given private key from which the split private keys may be generated. Further, each share alone cannot fully decrypt data, which had been encrypted using a matching public key to the given private key. Instead, the combination of all shares or all split private keys are necessary to decrypt the encrypted data, which would recover the original, unencrypted data (i.e., PHD). Conversely, in applying a split private key to EHD, an interim state of the data, which is still encrypted, is yielded. Only upon the application of the remaining one or more counterpart split private keys to the ISHD (i.e., the yielded interim state of the data) may the PHD be obtained.

In Step 1028, a data retrieval response is issued. In one embodiment of the invention, the data retrieval response may represent a reply to the data retrieval request (received in Step 1020) and, subsequently, may be directed to the particular host (i.e., representative of the requesting entity). Further, the data retrieval response may include the ISHD (obtained through translation of the host-source EHD in Step 1026).

In Step 1030, after alternatively determining (in Step 1022) that the requesting entity is the SRS, host-source EHD is identified. In one embodiment of the invention, the host-source EHD may represent host-pertinent data (described above) that had been consolidated on the SSS, where the host-source EHD may be identified using and, therefore may be associated with, the host identifier (received in Step 1020).

In Step 1032, a source entrusted target-source split private key is identified. In one embodiment of the invention, the source entrusted target-source split private key may be a confidential conversion key entrusted to the SSS. Further, the source entrusted target-source split private key may be used, by an asymmetric cryptographic algorithm executing on the SSS, to transform host-source EHD to ISHD (described above).

In Step 1034, the host-source EHD (identified in Step 1030) is translated to obtain ISHD. In one embodiment of the invention, translation of the host-source EHD may entail employing any existing or future developed asymmetric cryptographic algorithm (e.g., the Rivest-Shamir-Adleman (RSA) public-key encryption algorithm) Further, through the asymmetric cryptographic algorithm, the host-source EHD may be translated using the source entrusted target-source split private key (identified in Step 1032).

In Step 1036, a data retrieval response is issued. In one embodiment of the invention, the data retrieval response may represent a reply to the data retrieval request (received in Step 1020) and, subsequently, may be directed to the SRS (i.e., representative of the requesting entity). Further, the data retrieval response may include the ISHD (obtained through translation of the host-source EHD in Step 1034).

FIGS. 11A and 11B show flowcharts describing a method for fulfilling a storage replication request in accordance with one or more embodiments of the invention. The various steps outlined below may be performed by the storage replication system (SRS) (see e.g., FIG. 4). Further, while the various steps in the flowcharts are presented and described sequentially, one of ordinary skill will appreciate that some or all steps may be executed in different orders, may be combined or omitted, and some or all steps may be executed in parallel.

Turning to FIG. 11A, in Step 1100, a storage replication request is received. In one embodiment of the invention, the storage replication request may have been submitted by a computing system operated by an administrator of one or more system components shown in FIG. 1. Further, the storage replication request may pertain to the replication and migration of encrypted host-pertinent data (described above) from a source storage system (SSS) to a target storage system (TSS). Accordingly, the storage replication request may include a source storage identifier (SSID) associated with the SSS, a target storage identifier (TSID) associated with the TSS, and at least one host identifier associated with at least one host and the encrypted host-pertinent data sought for replication and migration.

In Step 1102, a connection with the trusted key authority (TKA) (see e.g., FIG. 1), is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

In Step 1104, through the connection (established in Step 1102), a key provision request is submitted to the TKA. In one embodiment of the invention, the key provision request may pertain to the provisioning of cryptographic keys, which would facilitate the migration of encrypted host-pertinent data from the SSS to the TSS. Accordingly, the key provision request may include the SSID, the TSID, and the at least one host identifier (all received in Step 1100). Further, in turn, the TKA may fulfill the key provision request in accordance with one or more embodiments of the invention (see e.g., FIGS. 8A-8C). Thereafter, in Step 1106, a request completion acknowledgment is received from the TKA. In one embodiment of the invention, the request completion acknowledgement may be issued, by the TKA and to the SRS, upon fulfillment of the key provision request (submitted in Step 1104); and may entail a message that may indicate a completion in the processing of the key provision request.

In Step 1108, a connection with the SSS, associated with the SSID (received in Step 1100), is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

Hereinafter, the following subset of steps (i.e., Step 1120 through Step 1126) are to be performed for each host identifier of the at least one host identifier (received in Step 1100). With that said, turning to FIG. 11B, in Step 1108, through the connection (established in Step 1108), a data retrieval request is submitted to the SSS. In one embodiment of the invention, the data retrieval request may pertain to the retrieval of host-pertinent data (described above) consolidated on the SSS. Further, the data retrieval request may include the host identifier associated with a particular host. Subsequently, in turn, the SSS may fulfill the data retrieval request in accordance with one or more embodiments of the invention (see e.g., FIG. 10B).

In Step 1122, a data retrieval response is received from the SSS. In one embodiment of the invention, the data retrieval response may be issued, by the SSS and to the SRS, following fulfillment of the data retrieval request (submitted in Step 1120). Further, the data retrieval response may include interim state host data (ISHD). ISHD may entail encrypted host-pertinent data (i.e., EHD) that has been translated using one, but not both (or all), of the split private keys needed to transform the EHD to plain host data (PHD) (i.e., unencrypted host-pertinent data).

In Step 1124, a connection with the TSS, associated with the TSID (received in Step 1100), is established. In one embodiment of the invention, the connection may be established using any existing or future developed wired and/or wireless communication protocols (e.g., transmission control protocol/Internet Protocol (TCP/IP), file transfer protocol (FTP), user datagram protocol (UDP), hypertext transfer protocol (HTTP), etc.).

In Step 1126, through the connection (established in Step 1124), a data consolidation request is issued to the TSS. In one embodiment of the invention, the data consolidation request may pertain to the retention of host-pertinent data (described above) on the TSS. Accordingly, the data consolidation request may include the ISHD (received from the SSS in Step 1122).

Figure 12:
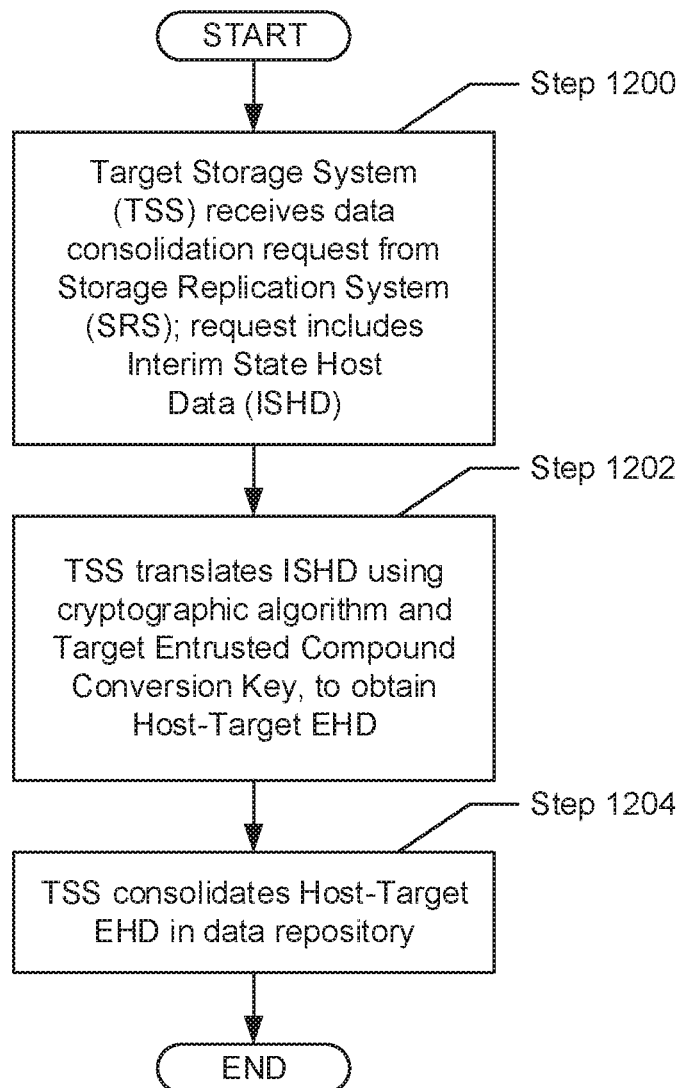
FIG. 12 shows a flowchart describing a method for fulfilling a data consolidation request in accordance with one or more embodiments of the invention.

FIG. 12 shows a flowchart describing a method for fulfilling a data consolidation request in accordance with one or more embodiments of the invention. The various steps outlined below may be performed by the target storage system (TSS) (see e.g., FIG. 5). Further, while the various steps in the flowcharts are presented and described sequentially, one of ordinary skill will appreciate that some or all steps may be executed in different orders, may be combined or omitted, and some or all steps may be executed in parallel.

Turning to FIG. 12, in Step 1200, a data consolidation request is received. In one embodiment of the invention, the data consolidation request may have been submitted by the storage replication system (see e.g., FIG. 1) and may pertain to the retention of host-pertinent data (described above) on the TSS. Further, the data consolidation request may include interim state host data (ISHD) in the process of migrating from a source storage system (SSS). ISHD may entail encrypted host-pertinent data (i.e., EHD) that has been translated using one, but not both (or all), of the split private keys needed to transform the EHD to plain host data (PHD) (i.e., unencrypted host-pertinent data).

In Step 1202, the ISHD (received in Step 1200) is translated. In one embodiment of the invention, translation of the ISHD may entail employing any existing or future developed asymmetric cryptographic algorithm (e.g., the Rivest-Shamir-Adleman (RSA) public-key encryption algorithm). Further, through the asymmetric cryptographic algorithm, the ISHD may be translated using a target entrusted compound conversion key, to obtain host-target encrypted host data (EHD) (i.e., host-pertinent data encrypted using a host-target public key). The target entrusted compound conversion key may be a fusion (or combination) of two cryptographic keys—i.e., a target entrusted target-source split private key and a host-target public key. The target entrusted target-source split private key may be a confidential conversion key, which may be entrusted to the TSS and used to transform the ISHD to plain host data (PHD) (i.e., unencrypted host-pertinent data). The host-target public key, on the other hand, may be a publicly-accessible encryption key, which may subsequently be used to transform the PHD (resulting from the first aforementioned transformation) to host-target EHD. Accordingly, embodying both of these cryptographic keys together, the target entrusted compound conversion key may be used to translate data from one encryption scheme to another without compromising or exposing the data.

In Step 1204, the host-target EHD (obtained through the translation of the ISHD in Step 1202) is consolidated. Specifically, in one embodiment of the invention, the host-target EHD may be stored in a data repository, which may be representative of a logical partition in physical storage residing on the TSS.

Figure 13:
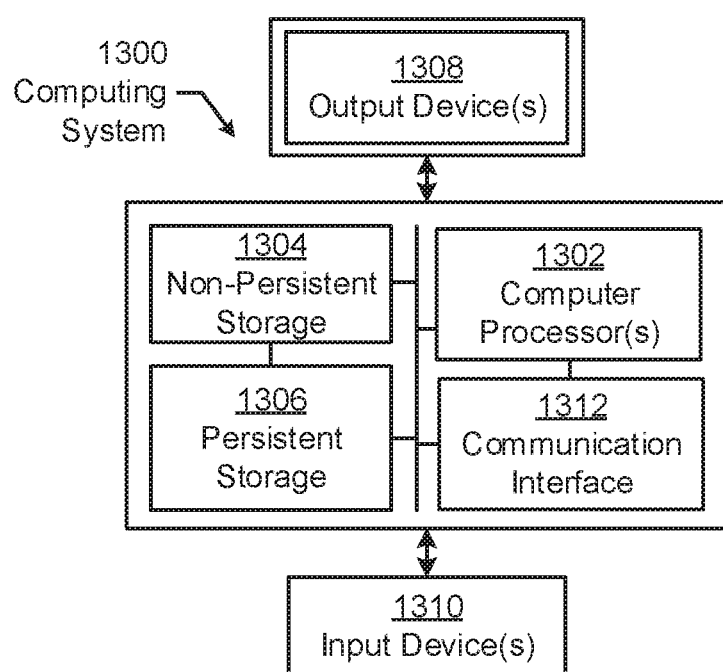
FIG. 13 shows a computing system in accordance with one or more embodiments of the invention.

FIG. 13 shows a computing system in accordance with one or more embodiments of the invention. The computing system (1300) may include one or more computer processors (1302), non-persistent storage (1304) (e.g., volatile memory, such as random access memory (RAM), cache memory), persistent storage (1306) (e.g., a hard disk, an optical drive such as a compact disk (CD) drive or digital versatile disk (DVD) drive, a flash memory, etc.), a communication interface (1312) (e.g., Bluetooth interface, infrared interface, network interface, optical interface, etc.), input devices (1310), output devices (1308), and numerous other elements (not shown) and functionalities. Each of these components is described below.

In one embodiment of the invention, the computer processor(s) (1302) may be an integrated circuit for processing instructions. For example, the computer processor(s) may be one or more cores or micro-cores of a processor. The computing system (1300) may also include one or more input devices (1310), such as a touchscreen, keyboard, mouse, microphone, touchpad, electronic pen, or any other type of input device. Further, the communication interface (1312) may include an integrated circuit for connecting the computing system (1300) to a network (not shown) (e.g., a local area network (LAN), a wide area network (WAN) such as the Internet, mobile network, or any other type of network) and/or to another device, such as another computing device.

In one embodiment of the invention, the computing system (1300) may include one or more output devices (1308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1302), non-persistent storage (1304), and persistent storage (1306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for provisioning cryptographic keys to facilitate encrypted data replication across storage systems, comprising:
   receiving a first key provision request comprising a source storage identifier (SSID) and a target storage identifier (TSID);
   in response to receiving the first key provision request:
      generating a target-source private key compatible with a host-source public key;
      splitting the target-source private key into a source entrusted target-source split private key and a target entrusted target-source split private key;
      providing the source entrusted target-source split private key to a source storage system associated with the SSID;
      combining the target entrusted target-source split private key and a host-target public key to obtain a target entrusted compound conversion key; and
      providing the target entrusted compound conversion key to a target storage system associated with the TSID.

2. The method of claim 1, wherein the host-source public key is associated with the SSID.

3. The method of claim 1, wherein the target entrusted compound conversion key is used to translate interim state host data (ISHD) migrated from the source storage system into host-target encrypted host data (EHD) to be stored on the target storage system during an encrypted data replication operation.

4. The method of claim 3, wherein the source entrusted target-source split private key is used to translate host-source EHD stored on the source storage system into the ISHD to be migrated to the target storage system during the encrypted data replication operation.

5. The method of claim 1, wherein the first key provision request further comprises a host identifier.

6. The method of claim 5, further comprising:
   prior to receiving the first key provision request:
      receiving a second key provision request comprising the SSID and the host identifier;
      in response to receiving the second key provision request:
         generating the host-source public key;
         generating a host-source private key compatible with the host-source public key;
         splitting the host-source private key into a host entrusted host-source split private key and a source entrusted host-source split private key;
         providing the host-source public key and the host entrusted host-source split private key to a host associated with the host identifier; and
         providing the source entrusted host-source split private key to the source storage system associated with the SSID.

7. The method of claim 6, wherein the host-source public key is used to translate plain host data (PHD) stored on the host into host-source encrypted host data (EHD) to be migrated to the source storage system during an encrypted data backup operation prior to a failure event.

8. The method of claim 7, wherein the source entrusted host-source split private key is used to translate the host-source EHD stored on the source storage system into interim state host data (ISHD) to be migrated to the host during an encrypted data recovery operation after the failure event.

9. The method of claim 8, wherein the host entrusted host-source split private key is used to translate the ISHD migrated from the source storage system into the PHD to be recovered on the host during the encrypted data recovery operation after the failure event.

10. The method of claim 5, further comprising:
    after providing the target entrusted compound conversion key to the target storage system:
       generating a host-target private key compatible with the host-target public key;
       splitting the host-target private key into a host entrusted host-target split private key and a target entrusted host-target split private key;
       providing the target entrusted host-target split private key to the target storage system; and
       providing the host-target public key and the host entrusted host-target split private key to a host associated with the host identifier.

11. A non-transitory computer readable medium (CRM) comprising computer readable program code, which when executed by a computer processor, enables the computer processor to:
    receive a first key provision request comprising a source storage identifier (SSID) and a target storage identifier (TSID);
    in response to receiving the first key provision request:
       generate a target-source private key compatible with a host-source public key;
       split the target-source private key into a source entrusted target-source split private key and a target entrusted target-source split private key;
       provide the source entrusted target-source split private key to a source storage system associated with the SSID;
       combine the target entrusted target-source split private key and a host-target public key to obtain a target entrusted compound conversion key; and
       provide the target entrusted compound conversion key to a target storage system associated with the TSID.

12. The non-transitory CRM of claim 11, wherein the host-source public key is associated with the SSID.

13. The non-transitory CRM of claim 11, wherein the target entrusted compound conversion key is used to translate interim state host data (ISHD) migrated from the source storage system into host-target encrypted host data (EHD) to be stored on the target storage system during an encrypted data replication operation.

14. The non-transitory CRM of claim 13, wherein the source entrusted target-source split private key is used to translate host-source EHD stored on the source storage system into the ISHD to be migrated to the target storage system during the encrypted data replication operation.

15. The non-transitory CRM of claim 11, wherein the first key provision request further comprises a host identifier.

16. The non-transitory CRM of claim 15, comprising additional computer readable program code, which when executed by the computer processor, further enables the computer processor to:

prior to receiving the first key provision request:
receive a second key provision request comprising the SSID and the host identifier;
in response to receiving the second key provision request:
generate the host-source public key;
generate a host-source private key compatible with the host-source public key;
split the host-source private key into a host entrusted host-source split private key and a source entrusted host-source split private key;
provide the host-source public key and the host entrusted host-source split private key to a host associated with the host identifier; and
provide the source entrusted host-source split private key to the source storage system associated with the SSID.

17. The non-transitory CRM of claim 16, wherein the host-source public key is used to translate plain host data (PHD) stored on the host into host-source encrypted host data (EHD) to be migrated to the source storage system during an encrypted data backup operation prior to a failure event.

18. The non-transitory CRM of claim 17, wherein the source entrusted host-source split private key is used to translate the host-source EHD stored on the source storage system into interim state host data (ISHD) to be migrated to the host during an encrypted data recovery operation after the failure event.

19. The non-transitory CRM of claim 18, wherein the host entrusted host-source split private key is used to translate the ISHD migrated from the source storage system into the PHD to be recovered on the host during the encrypted data recovery operation after the failure event.

20. The non-transitory CRM of claim 15, comprising additional computer readable program code, which when executed by the computer processor, further enables the computer processor to:

after providing the target entrusted compound conversion key to the target storage system:
generate a host-target private key compatible with the host-target public key;
split the host-target private key into a host entrusted host-target split private key and a target entrusted host-target split private key;
provide the target entrusted host-target split private key to the target storage system; and
provide the host-target public key and the host entrusted host-target split private key to a host associated with the host identifier.

\* \* \* \* \*